(12) United States Patent
Inam et al.

(10) Patent No.: US 11,122,400 B2
(45) Date of Patent: Sep. 14, 2021

(54) COMMUNICATION DEVICE, FIRST RADIO NODE, SECOND RADIO NODE, AND METHODS THEREIN, FOR DETERMINING WHETHER TO ALLOW A FIRST VEHICLE TO OVERTAKE A VEHICLE PLATOON

(71) Applicant: Telefonaktiebolaget LM Ericsson (publ), Stockholm (SE)

(72) Inventors: Rafia Inam, Västerås (SE); Elena Fersman, Stockholm (SE); Athanasios Karapantelakis, Stockholm (SE); Konstantinos Vandikas, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1 day.

(21) Appl. No.: 15/757,478

(22) PCT Filed: Sep. 17, 2015

(86) PCT No.: PCT/SE2015/050974
§ 371 (c)(1),
(2) Date: Mar. 5, 2018

(87) PCT Pub. No.: WO2017/048165
PCT Pub. Date: Mar. 23, 2017

(65) Prior Publication Data
US 2018/0253976 A1  Sep. 6, 2018

(51) Int. Cl.
*H04W 4/46* (2018.01)
*G08G 1/0967* (2006.01)
(Continued)

(52) U.S. Cl.
CPC ........ *H04W 4/46* (2018.02); *G08G 1/096708* (2013.01); *G08G 1/22* (2013.01);
(Continued)

(58) Field of Classification Search
None
See application file for complete search history.

(56) References Cited

U.S. PATENT DOCUMENTS 5,777,451 A * 7/1998 Kobayashi ............. G08G 1/166
318/587
5,781,119 A * 7/1998 Yamashita ............. G05D 1/024
180/168
(Continued)

FOREIGN PATENT DOCUMENTS

CN 102610125 A 7/2012
CN 103606270 A 2/2014
(Continued)

OTHER PUBLICATIONS

"Assessing the Fuel-Saving Potential of Semiautomated Truck Platooning", https://www.nrel.gov/docs/fy15osti/64133.pdf, Jun. 2015, p. 1.
(Continued)

*Primary Examiner* — Curtis J King
(74) *Attorney, Agent, or Firm* — Murphy, Bilak & Homiller, PLLC

(57) ABSTRACT

Method performed by a communication device (150) to determine whether to allow a first vehicle (111) to overtake a vehicle platoon (120). The platoon (120) comprises two or more second vehicles (121, 122, 123, 124). The communication device obtains (202) information about the first vehicle (111), when the first vehicle (111) is within a first distance (131) behind the platoon (120). The communication device then determines (203) whether to allow the first vehicle (111) to overtake the platoon (120) based on the obtained information. The communication device then provides (207), based on a result of the determining (203), a first indication to at least one of: a) a first radio node (161) in the first vehicle (111), and b) a second radio node (162) in one
(Continued)

of the second vehicles (121) in the platoon. A method performed by the first (161) and the second (162) radio nodes is also disclosed. Publ.

16 Claims, 12 Drawing Sheets

(51) Int. Cl.
*G08G 1/00* (2006.01)
*H04W 4/80* (2018.01)
*H04W 4/029* (2018.01)
*H04W 4/02* (2018.01)

(52) U.S. Cl.
CPC ............ *H04W 4/023* (2013.01); *H04W 4/027* (2013.01); *H04W 4/029* (2018.02); *H04W 4/80* (2018.02)

(56) References Cited

U.S. PATENT DOCUMENTS

| | | | | |
|---|---|---|---|---|
| 6,032,097 | A * | 2/2000 | Iihoshi | G05D 1/0293 701/96 |
| 7,277,028 | B1 * | 10/2007 | Janke | G08G 1/096716 340/905 |
| 8,352,111 | B2 | 1/2013 | Mudalige | |
| 8,620,517 | B2 | 12/2013 | Caveney et al. | |
| 8,682,511 | B2 | 3/2014 | Andreasson et al. | |
| 9,037,389 | B2 * | 5/2015 | You | G08G 1/22 701/117 |
| 9,141,112 | B1 * | 9/2015 | Loo | G05D 1/0293 |
| 9,396,661 | B2 * | 7/2016 | Okamoto | G08G 1/22 |
| 2009/0299552 | A1 * | 12/2009 | Villaume | G08G 1/22 701/3 |
| 2012/0188374 | A1 | 7/2012 | Taner | |
| 2013/0211624 | A1 * | 8/2013 | Lind | G08G 1/22 701/2 |
| 2014/0100734 | A1 * | 4/2014 | Yamashiro | G08G 1/22 701/23 |
| 2014/0107867 | A1 * | 4/2014 | Yamashiro | G08G 1/22 701/2 |
| 2015/0061894 | A1 | 3/2015 | Strassberger | |
| 2015/0081202 | A1 * | 3/2015 | Levin | B60W 40/04 701/400 |
| 2015/0353094 | A1 * | 12/2015 | Harda | B60W 30/18163 701/23 |
| 2016/0019782 | A1 * | 1/2016 | Alam | G05D 1/0287 340/905 |
| 2016/0026187 | A1 * | 1/2016 | Alam | B60W 30/16 701/23 |
| 2016/0054735 | A1 * | 2/2016 | Switkes | G08G 1/22 701/23 |
| 2016/0121893 | A1 * | 5/2016 | Ask | B60W 30/16 701/96 |
| 2016/0297447 | A1 * | 10/2016 | Suzuki | B60W 30/16 |
| 2017/0011633 | A1 * | 1/2017 | Boegel | G05D 1/0293 |
| 2017/0186327 | A1 * | 6/2017 | Uysal | G08G 1/22 |
| 2017/0278390 | A1 * | 9/2017 | Zydek | G08G 1/096791 |
| 2017/0308090 | A1 * | 10/2017 | Asakura | G01C 21/3469 |
| 2017/0329348 | A1 * | 11/2017 | Li | B60K 31/00 |
| 2017/0361762 | A1 * | 12/2017 | Wunsche, III | B60Q 1/28 |
| 2018/0005460 | A1 * | 1/2018 | Alieiev | G08G 1/096791 |
| 2018/0176750 | A1 * | 6/2018 | Xu | H04L 29/08 |
| 2018/0188746 | A1 * | 7/2018 | Lesher | G05D 1/0295 |
| 2018/0190128 | A1 * | 7/2018 | Saigusa | G08G 1/22 |
| 2018/0237012 | A1 * | 8/2018 | Jammoussi | G08G 1/0962 |
| 2018/0348791 | A1 * | 12/2018 | Hendrickson | G05D 1/0293 |

FOREIGN PATENT DOCUMENTS

| | | |
|---|---|---|
| CN | 104424819 A | 3/2015 |
| CN | 104700612 A | 6/2015 |
| EP | 2881926 A1 | 6/2015 |
| WO | 2013187835 A1 | 12/2013 |

OTHER PUBLICATIONS

Hegeman, Geertje et al., "Overtaking assistant assessment using traffic simulation", Transportation Research Part C; Emerging Technologies, Pergamon, New York, NY; vol. 17, No. 6; www.elsevier.com/locate/trc, Dec. 1, 2009, pp. 617-630.

Suzuki, Masaki et al., "Overtaking Priority Management Method Between Platoons and Surrounding Vehicles Considering Carbon Dioxide Emissions (Poster)", IEEE Vehicular Networking Conference (VNC), Nov. 14, 2011, pp. 260-267.

* cited by examiner

COMMUNICATION DEVICE, FIRST RADIO NODE, SECOND RADIO NODE, AND METHODS THEREIN, FOR DETERMINING WHETHER TO ALLOW A FIRST VEHICLE TO OVERTAKE A VEHICLE PLATOON

TECHNICAL FIELD

The present disclosure relates generally to a communication device and methods therein for determining whether to allow a first vehicle to overtake a vehicle platoon. The present disclosure also relates generally to a first radio node and methods therein for providing to the first vehicle an indication to overtake a vehicle platoon. The present disclosure further relates generally to a second radio node and methods therein for obtaining a first indication from the communication device.

BACKGROUND

Communication devices such as terminals are also known as e.g. User Equipments (UEs), wireless devices, mobile terminals, wireless terminals and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a Base Station (BS), e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In $3^{rd}$ Generation Partnership Project (3GPP) Long Term Evolution (LTE), base stations, which may be referred to as Evolved Nodes B (eNodeBs) or even eNBs, may be directly connected to one or more core networks.

3GPP LTE radio access standard has been written in order to support high bitrates and low latency both for uplink and downlink traffic. All data transmission is in LTE controlled by the radio base station.

Vehicle platooning groups vehicles in roads in order to increase traffic efficiency, reduce fuel consumption and emissions for vehicles in the platoon due to reduced aerodynamic drag, to combat driving stress, and to reduce traffic congestions.

A vehicle platoon, according to existing methods, is understood herein as a group of moving vehicles, in the same direction, in the same driving lane one behind the other, with no other vehicles in-between. An example of a vehicle platoon may be described as in http://www.nrel.gov/docs/fy15osti/64133.pdf. In a particular example of a vehicle platoon, a gap, or space, between each vehicle may be between 0.2 to 0.8 seconds.

Current state of art focuses on the management of vehicle platoon lifecycle, such as platoon forming, operation, decommissioning, etc. . . . . . See for example U.S. Pat. Nos . 8,682,511 B2, 8,620,517 B2, and 8,352,111 B2. While vehicle platooning provides advantages for traffic, environment and reduces cost of travel, it does pose a problem for approaching vehicles willing to overtake the platoon, e.g., in situations where the road has one lane per direction and the line-of-sight for overtaking may be limited.

SUMMARY

It is an object of embodiments herein to improve the overtaking by a vehicle of a vehicle platoon.

According to a first aspect of embodiments herein, the object is achieved by a method performed by a communication device to determine whether to allow a first vehicle to overtake a vehicle platoon. The vehicle platoon comprises two or more second vehicles. The communication device obtains information about the first vehicle, when the first vehicle is within a first distance behind the vehicle platoon. The communication device determines whether to allow the first vehicle to overtake the vehicle platoon based on the obtained information. The communication device also provides, based on a result of the determining, a first indication to at least one of: a) a first radio node in the first vehicle, and b) a second radio node in one of the second vehicles in the vehicle platoon.

According to a second aspect of embodiments herein, the object is achieved by a method performed by a second radio node in one vehicle in a vehicle platoon. The vehicle platoon comprises two or more second vehicles. The second radio node obtains the first indication from the communication device. The first indication is one of: a) the authorization to the first vehicle within the first distance behind the vehicle platoon to overtake the vehicle platoon, b) the request for the last vehicle in the vehicle platoon to signal an authorization to overtake to the first vehicle, c) the request for at least one of the second vehicles in the vehicle platoon to create the space for overtaking in the vehicle platoon for the first vehicle, d) the signal to the first vehicle to not attempt to overtake the vehicle platoon, and e) the request for the last vehicle in the vehicle platoon to signal to the first vehicle to not attempt to overtake vehicle platoon. The second radio node also provides the obtained first indication to one of: a) the first radio node in the first vehicle, and b) the third radio node in one of the second vehicles in the vehicle platoon.

According to a third aspect of embodiments herein, the object is achieved by a method performed by a first radio node in the first vehicle for providing to the first vehicle the indication to overtake a vehicle platoon. The vehicle platoon comprises two or more second vehicles. The first radio node obtains the first indication, from one of: i) the communication device, ii) the last vehicle in the vehicle platoon, and iii) the second radio node in one of the second vehicles in the vehicle platoon. The first indication is one of: a) the authorization to overtake the vehicle platoon, and b) the signal to the first vehicle (111) to not attempt to overtake the vehicle platoon. The first radio node also provides to the first vehicle, a second signal to overtake the vehicle platoon. The providing is based on the obtained first indication.

According to a fourth aspect of embodiments herein, the object is achieved by the communication device configured to determine whether to allow the first vehicle to overtake the vehicle platoon. The vehicle platoon comprises two or more second vehicles. The communication device is further configured to obtain information about the first vehicle, when the first vehicle is within the first distance behind the vehicle platoon. The communication device is further configured to determine whether to allow the first vehicle to overtake the vehicle platoon based on the obtained information. The communication device is further configured to provide, based on a result of the determining, the first indication to at least one of: a) the first radio node in the first vehicle, and b) the second radio node in one of the second vehicles in the vehicle platoon.

According to a fifth aspect of embodiments herein, the object is achieved by the second radio node configured to be located in one vehicle in the vehicle platoon. The vehicle platoon comprises two or more second vehicles. The second radio node is further configured to obtain the first indication from the communication device. The first indication is one of: a) the authorization to the first vehicle within the first distance behind the vehicle platoon to overtake the vehicle platoon, b) the request for the last vehicle in the vehicle platoon to signal the authorization to overtake to the first vehicle, c) the request for at least one of the second vehicles in the vehicle platoon to create the space for overtaking in the vehicle platoon for the first vehicle, d) the signal to the first vehicle to not attempt to overtake the vehicle platoon, and e) the request for the last vehicle in the vehicle platoon to signal to the first vehicle to not attempt to overtake the vehicle platoon. The second radio node is further configured to provide the obtained first indication to one of: a) the first radio node in the first vehicle, and b) the third radio node in one of the second vehicles in the vehicle platoon.

According to a sixth aspect of embodiments herein, the object is achieved by a first radio node configured to be located in the first vehicle for providing to the first vehicle the indication to overtake the vehicle platoon. The vehicle platoon comprises two or more second vehicles. The first radio node is further configured to obtain the first indication, from one of: i) the communication device, ii) the last vehicle in the vehicle platoon, and iii) the second radio node in one of the second vehicles in the vehicle platoon. The first indication is one of: a) the authorization to overtake the vehicle platoon, and b) the signal to the first vehicle to not attempt to overtake the vehicle platoon. The first radio node is further configured to provide, to the first vehicle the second signal to overtake the vehicle platoon. The providing is based on the obtained first indication.

By the communication device determining whether to allow the first vehicle to overtake the vehicle platoon based on the obtained information about the first vehicle, and providing the first indication based on the result of the determining, the communication device is able to ensure a safe overtake of the platoon by the first vehicle in a safe manner by, for example, creating temporary space within the platoon by splitting up and remerging of platooned vehicles. The first vehicle may be any type of vehicle. The vehicle platoon may therefore include a large number of vehicles, as no matter how large the platoon, it may split up and remerge in order to create one or more spaces for the overtaking vehicle.

Further advantages of some embodiments disclosed herein are discussed below.

BRIEF DESCRIPTION OF THE DRAWINGS

Examples of embodiments herein are described in more detail with reference to the accompanying drawings, in which.

DETAILED DESCRIPTION

As part of the development of embodiments herein, a problem associated with existing methods will first be identified and discussed. A small subset of existing methods on vehicle platooning focuses on the challenge a platoon poses on the approaching vehicles wanting to overtake, such as that described by Masaki Suzuki, Ryo Harada, Shohei Kanda and Hiroshi Shigeno in "Overtaking Priority Management Method Between Platoons and Surrounding Vehicles Considering Carbon Dioxide Emissions", Graduate School of Science and Technology, Keio University, in 2011 IEEE Vehicular Networking Conference (VNC). However, these methods study this concept by considering the platoons as static groups of vehicles with a focus on reduced emissions.

Embodiments herein may be understood as relating to a mechanism for optimal vehicle platoon overtaking. That is, embodiments herein may be understood as relating to a method for approaching vehicles to safely overtake platoons. Embodiments herein allow for a detailed overtaking process to happen in multiple steps, that is, repeated set of steps of partial overtaking of the platoon, merging on the platoon lane and subsequent continuation of the overtaking process. Thus, embodiments herein may take into account multiple factors other than emissions.

Embodiments will now be described more fully hereinafter with reference to the accompanying drawings, in which examples of the claimed subject matter are shown. The claimed subject matter may, however, be embodied in many different forms and should not be construed as limited to the embodiments set forth herein. Rather, these embodiments are provided so that this disclosure will be thorough and complete, and will fully convey the scope of the claimed subject matter to those skilled in the art. It should also be noted that these embodiments are not mutually exclusive. Components from one embodiment may be tacitly assumed to be present/used in another embodiment.

Figure 1:
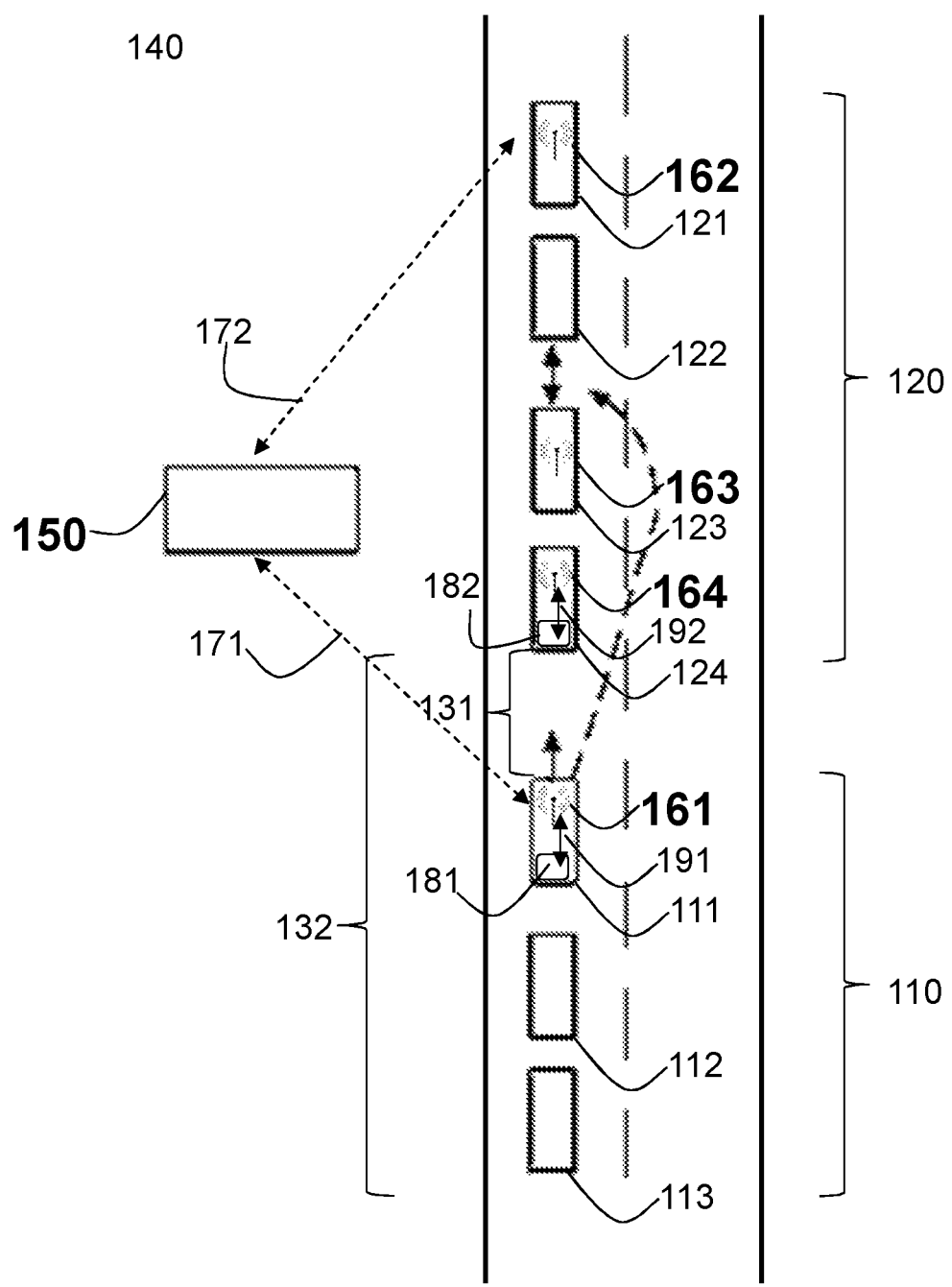
FIG. 1 is a schematic diagram illustrating a wireless communications network, according to some embodiments.

FIG. 1 depicts a scenario in which embodiments herein may be implemented. The scenario illustrated in FIG. 1 comprises a one or more first vehicles 110. The one or more first vehicles 110, e.g., cars, motorcycles, trucks, bicycles, etc., comprise a first vehicle 111, or first first vehicle 111. Other first vehicles 112, 113 may also be comprised in the one or more first vehicles 110. In the non-limiting example depicted in FIG. 1, the other first vehicles 112, 113 comprise two vehicles, that is, a second first vehicle 112, and a third first vehicle 113. Any of the one or more first vehicles 110 may be autonomous, that is, driver-less, or have a human driver. The human driver may be assisted by automated driving features.

The scenario illustrated in FIG. 1 in which embodiments herein may be implemented also comprises a vehicle platoon 120. The vehicle platoon 120 comprises two or more second vehicles 121, 122, 123, 124. In the non-limiting example depicted in FIG. 1, the two or more second vehicles 121, 122, 123, 124 comprise four second vehicles: a first second vehicle 121, a second second vehicle 122, a third second vehicle 123 and a fourth second vehicle 124. Each of the two or more second vehicles 121, 122, 123, 124 may be a, e.g., car, motorcycle, truck, bicycle, etc., and it may be autonomous, or have a human driver. The human driver may be assisted by automated driving features. In some embodiments, one of the two or more second vehicles 121, 122, 123, 124 may be designated as a leader or master 121. In such embodiments, the other second vehicles 122, 123, 124 may be designated as slaves. In some embodiments, the leader vehicle may have a human driver.

The first vehicle 111 is within a first distance 131 behind the vehicle platoon 120. The one or more first vehicles 110 are within a second distance 132 behind the vehicle platoon 120. The one or more first vehicles 110 may be willing to overtake the vehicle platoon 120 if for example, one or more current conditions in an environment of the vehicle platoon 110, e.g., road conditions, are safe. That is, e.g., if overtaking the platoon has no risk of running into a vehicle coming from the other direction in the lane used for the overtaking. That is, in some embodiments, there is only one first vehicle 111 willing to overtake the vehicle platoon 120, and in other embodiments, there are several first vehicles 111, 112, 113 willing to overtake the platoon.

The scenario of FIG. 1 also comprises a wireless communications network 140. The wireless communications network 140 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, EDGE network, network comprising of any combination of Radio Access Technologies (RATs) such as e.g. Multi-Standard Radio (MSR) base stations, multi-RAT base stations etc., 802.11p and LTE-U, LTE Proximity services (ProSe), 3GPP TR 23.303, LTE-Advanced technology (LTE-A), any 3rd Generation Partnership Project (3GPP) cellular network, WiFi network, Worldwide Interoperability for Microwave Access (WiMax), 5G system or any cellular network or system. Certain short range, high-frequency communications may be used for communication between vehicles in the platoon, e.g., Distributed Short-Range Communications (DSRC).

The wireless communications network 140 comprises a communication device 150. In some embodiments, the communication device 150 may be a core network node. The core network node may be a MME or any other core network element such as a new and dedicated gateway or MME for the Short-Range Radio (SRR)/capillary network management. In some other embodiments, the communication device 150 may be a radio network node in the wireless communications network 140. The radio network node may be a base station such as e.g. an eNB, eNodeB, or a Home Node B, a Home eNode B, femto Base Station, BS, pico BS, an RSU, or any other network unit capable to serve a wireless device or a machine type communication device in the wireless communications network 140. In some particular embodiments, the radio network node may be a stationary relay node or a mobile relay node. The wireless communications network 140 covers a geographical area which may be divided into cell areas, wherein each cell area may be served by a radio network node, although, one radio network node may serve one or several cells. The radio network node may be e.g. macro eNodeB, home eNodeB or pico base station, based on transmission power and thereby also cell size. The radio network node may support one or several cellular communication technologies, and its name may depend on the technology and terminology used. The communication device 150 may be located within the vehicle platoon 120, e.g., in one of its members, or it may be a cloud service. In the embodiments wherein the communication device 150 is a cloud service, the communication device 150 may be referred to herein as a cloud agent or platoon cloud agent.

At least one of a first radio node 161, a second radio node 162, a third radio node 163 and a fourth radio node 164 are located in the wireless communication network 140. Each of the first radio node 161, the second radio node 162 and the third radio node 163 may be, for example, a cellular modem, or vehicle-mounted mobile device, enabled to communicate voice and/or data, via the RAN, with another entity, such as a server, a laptop, a Personal Digital Assistant (PDA), or a tablet computer, sometimes referred to as a surf plate with wireless capability, Machine-to-Machine (M2M) devices, devices equipped with a wireless interface, such as a printer or a file storage device, modems, or any other radio network unit capable of communicating over a radio link in the wireless communications network 140. Each of the first radio node 161, the second radio node 162, the third radio node 163 and the fourth radio node 164 may be, for example, a short-range radio gateway, that is, a node utilizing non-cellular radio technology such as a Wi-Fi AP 250. The radio node may be self-standing, or it may also be, in some embodiments, comprised in a UE. Each of the first radio node 161, the second radio node 162, the third radio node 163 and the fourth radio node 164 may be a multi-carrier/multi-radio node, and it may support more than one technology, e.g., IEEE 802.11ah, BLE etc. . . . . Each of the first radio node 161, the second radio node 162, the third radio node 163 and the fourth radio node 164 may further be referred to as a UE, mobile telephone, cellular telephone, or laptop with wireless capability, just to mention some further examples, and may be in the present context, for example, portable, pocket-storable, hand-held, or computer-comprised.

In the embodiments comprising the first radio node 161, it is located in the first vehicle 111, as a built-in radio node, or as a portable radio node. The second radio node 162 may be located in any of the two or more second vehicles 121, 122, 123, 124 in the vehicle platoon 120, also, as a built-in radio node, or as a portable radio node. In the non-typical example of FIG. 1, the second radio node 162 is located in the first second vehicle 121, which is located in the most advanced position of the vehicle platoon 120. The first second vehicle 121 located in the most advanced position in the vehicle platoon 120 may typically be designated as the leader vehicle of the vehicle platoon 120, given the fact that it has the best visibility of the road where the vehicle platoon 120 is riding. The third radio node 163 is also located in one of the second vehicles 123 in the vehicle platoon 120, also as a built-in radio node, or as a portable radio node. In the non-limiting example depicted in FIG. 1, the third radio node 163 is located in the third second vehicle 123. However, the third radio node 163 may be located in any of the other second vehicles in the vehicle platoon 120. The fourth radio node 164 is also located in one of the second vehicles 124 in the vehicle platoon 120, also as a built-in radio node, or as a portable radio node. In the non-limiting example depicted in FIG. 1, the fourth radio node 164 is located in a last vehicle in the vehicle platoon 120, that is, the fourth second vehicle 124 in the example of FIG. 1.

Each of the first radio node 161, the second radio node 162, the third radio node 163 and the fourth radio node 164 is wireless, i.e., it is enabled to communicate wirelessly in the wireless communications network 140, sometimes also referred to as a cellular radio system or cellular network.

The first radio node 161 may communicate with the communication device 150 over a first link 171. The first link 171 may be a direct link, or an indirect link, if it is established through other nodes. The first link 171 may be a radio link, e.g., in the embodiments wherein the communication device 150 is a radio node. In the embodiments wherein the communication device 150 is a core network node, the first link 171 may be at least partially, a wired link.

The second radio node 162 may communicate with the communication device 150 over a second link 172. The second link 172 may be a direct link, or an indirect link, if it is established through other intermediary nodes. The second link 172 may be a radio link, e.g., in the embodiments wherein the communication device 150 is a radio node. In the embodiments wherein the communication device 150 is a core network node, the second link 172 may be at least partially, a wired link. Each of the other radio nodes in the second vehicles of the vehicle platoon 120 may communicate with the communication device 150 with a respective link, with a similar description to that provided for the second link 172. None of these links are depicted in FIG. 1 to simplify the figure. In other figures, these links may be referred to as a fifth link and a sixth link.

The first vehicle 111 may have a first interface 181. The first interface 181 may be a notification interface such as an electronic display, e.g. a screen. The last vehicle in the vehicle platoon 120, that is, the fourth second vehicle 124 in the example of FIG. 1, may have a second interface 182. The fourth second vehicle 124 may also be referred to herein as the last vehicle 124. The second interface 182 may be a notification interface such as a blinking light or an electronic display, e.g. a screen.

The first radio node 161 may communicate with the first interface 181 over a third link 191, which may be a wired link or a radio link. The radio node 164 in the last vehicle 124 in the vehicle platoon 120 may communicate with the second interface 182 over a fourth link 192, which may be a wired link or a radio link.

Each of the second vehicles 121, 122, 123, 124 in the vehicle platoon 120 has its respective radio node, with a description equivalent to that provided above for the second radio node 162 and the third radio node 163. This is not depicted in FIG. 1 to simplify the figure. Each of the first vehicles 111, 112, 113 may also have its respective radio node, with a description equivalent to that provided above for the first radio node 161. This is also not depicted in FIG. 1 to simplify the figure. However, in some embodiments, one or more of the one or more first vehicles 110 may not have a radio node. Also, other radio nodes may be located in the wireless communications network 140. This is not depicted in FIG. 1 for the sake of simplicity. Any of the first radio node 161, the second radio node 162, the third radio node 163 and the fourth radio node 164 may communicate with each other over a radio link. This may be done e.g., using short range, high-frequency communications, e.g., DSRC. However, none of these radio links are depicted in FIG. 1 to simplify the figure.

Figure 2:
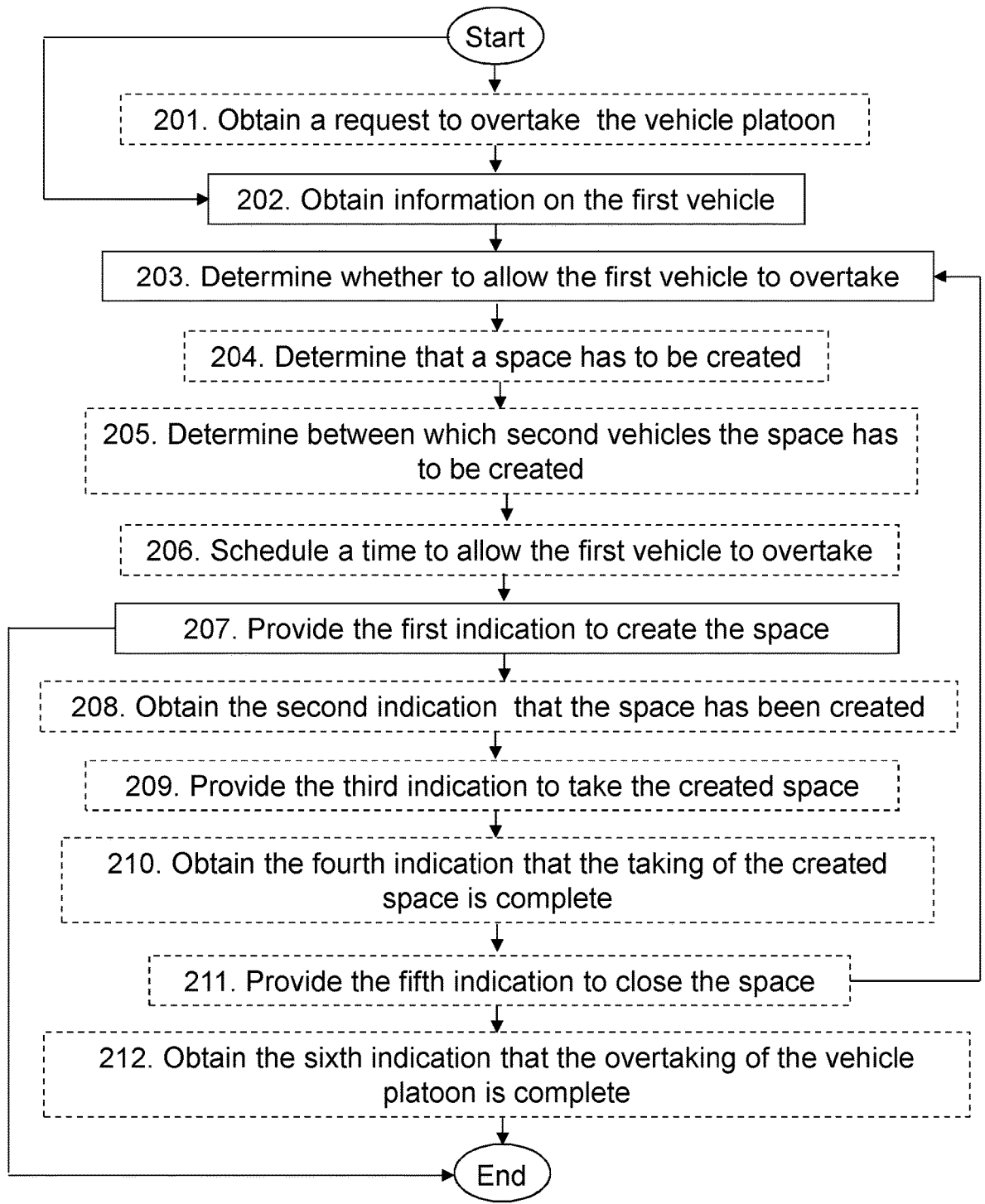
FIG. 2 is a schematic diagram illustrating embodiments of a method in a communication device, according to some embodiments.

Embodiments of a method performed by a communication device 150 to determine whether to allow a first vehicle 111 to overtake a vehicle platoon 120, will now be described with reference to the flowchart depicted depicted in FIG. 2. The communication device 150 operates in the wireless communications network 140. The vehicle platoon 120 comprises two or more second vehicles 121, 122, 123, 124. As explained below, overtaking of the vehicle platoon 120 may comprise a step-wise overtaking, that is overtaking of at least some of the two or more second vehicles 121, 122, 123, 124.

The method may comprise the following actions, which actions may as well be carried out in another suitable order than that described below.

Action 201

When the vehicle platoon 120 occupies a section of a road, an approaching vehicle such as the first vehicle 111 may be willing to overtake the vehicle platoon. In the case the first vehicle 111 is driven by a human driver, it is understood herein that any reference herein to the first vehicle 111 performing an action, refers to the driver of the vehicle performing the action.

As mentioned earlier, in some embodiments, the first vehicle 111 may be capable to communicate with the communication device 150 via radio, through the first radio node 161. In such embodiments, in this action, the communication device 150 may obtain a request from the first radio node 161, for the first vehicle 111 to overtake the vehicle platoon 120. The request may be in the form of a radio message. The request may include information about the first vehicle 111, such as a dynamic profile of the vehicle, i.e., its length, speed, acceleration and deceleration capability, traffic priority and distance from the platoon tail.

Wherever an obtaining action is described herein, it will be understood to comprise any of receiving directly from the named node, or indirectly from the same node, via one or more intermediate nodes, and therefore via one or more links, that may be wired, or radio links, as appropriate. For example, in this Action 201, the communication device 150 may obtain the request from the first radio node 161 directly via the first link 171, or via the second radio node 162 via the second link 172, or another radio node, in the vehicle platoon 120, via a similar link.

In the Service-oriented Architecture (SoA), high priority vehicles such as an ambulance, a police car, a fire brigade vehicle, etc . . . , may have the possibility of interacting with traffic lights in different ways, either via an acoustic system, line-of-sight, localized radio signals, or positioning systems. Examples of positioning systems may be satellite positioning systems such as e.g., Global Position System (GPS), Galileo, GLONASS. In some embodiments, wherein the first vehicle 111 is a high priority vehicle, the first vehicle 111 may use one of the aforementioned short-range communication technologies in order to indicate emergency access. In such embodiments, the origin of the request may come from the technology that the corresponding emergency first vehicle 111 employs to indicate traffic preemption.

This Action 201 is optional.

Action 202

In this action, the communication device 150 obtains information about the first vehicle 111, when the first vehicle 111 is within a first distance 131 behind the vehicle platoon 120, e.g., when the first vehicle 111 is approaching the vehicle platoon 120.

That is, in this action, the communication device 150 may perform a protocol for transferring information from an approaching vehicle willing to overtake a platoon in front. Obtaining information refers herein to receiving the information from another node, such as the first radio node 161, the second radio node 162, or the fourth radio node 164, or to autonomously determining or measuring the information, or to a combination of any of these possibilities. The aforementioned information may include the following parameters: a) vehicle length, b) average speed of the vehicle, c) distance of the vehicle from the platoon, d) acceleration and deceleration, that is, braking capability of the vehicle, d) vehicle priority class, e.g., cars in an emergency situation, such as police, ambulance, or fire brigade cars can have higher priority than other vehicles. The information may also include whether a radio node, such as the first radio node 161 is located in the first vehicle 111.

In case that the first vehicle 111 does not have radio access, the dynamic profile of this vehicle, i.e., its length, speed, acceleration and deceleration capability, traffic priority and distance from the platoon tail may be determined by the communication device 150 or obtained by the communication device 150 via, for example the fourth radio node 164 in the last vehicle 124 in the vehicle platoon 120. The fourth radio node 164 in the last vehicle 124 of the vehicle platoon 120 may use a camera to capture the registration plate of the first vehicle 111, as well as a radar or lidar to capture a speed and distance of the first vehicle 111. The fourth radio node 164 may then and send the information to the communication device 150.

The communication device 150 may then retrieve the characteristics of the first vehicle 111, such as length, acceleration and deceleration capabilities, traffic priority, by querying for those characteristics based on the registration plate of the first vehicle 111, see for example https://fordonsfraga.transportstyrelsen.se/fragapaannatfordon.aspx for Sweden.

In some embodiments, the communication device 150 may be located in the last vehicle 124 in the vehicle platoon 120, and it may therefore obtain the information in this action itself.

In the embodiments wherein the action 201 has been performed, the obtaining of the information may be based on the obtained request in action 201. That is, the obtaining of the information may be triggered by receiving the request from the first radio node 161. In some particular embodiments, the information may also be comprised in the obtained request.

Action 203

In this action, the communication device 150 determines whether to allow the first vehicle 111 to overtake the vehicle platoon 120 based on the obtained information. The determining may also be based on one or more current conditions in an environment of the vehicle platoon 120. The environment of the vehicle platoon 120 may comprise, the road, the atmosphere, the incoming traffic, etc. . . . . The one or more conditions of the environment of the vehicle platoon 120 may therefore comprise the characteristics of the road where the vehicle platoon 120 is riding, e.g., whether the road is straight or curvy, the atmospheric conditions at the time of overtaking, the incoming traffic, such as distance of the nearest approaching car in the opposite direction, speed of this car, the visibility, etc. . . . . This may be implemented by the communication device 150 retrieving weather, atmosphere conditions and/or cartography information from open services. The information regarding incoming traffic may be detected by e.g., one or more radar or lidar sensors mounted on the second vehicles, or with the help of mobile data provided from a mobile network operator.

In other words, in this action, the communication device 150 may analyze the obtained information, e.g. the parameters sent by either the first radio node 161, the second radio node 162, or the fourth radio node 164, and make a decision for the trailing first vehicle 111 to overtake the vehicle platoon 120, whether the first vehicle 111 may overtake the vehicle platoon 120 directly, or whether further actions are needed. That is, the communication device 150 may in the subsequent actions either issue an overtaking command to the first vehicle 111 directly. In some embodiments, the communication device 150 may analyse also the available space needed for overtaking in the vehicle platoon 120. In such cases, the communication device 150 may first instruct some platoon members to make space for the first vehicle 111, as explained below.

For example, if the vehicle platoon 120 comprises a low number of vehicles, the first vehicle 111 has an engine with high horse power, and the road is a straight road with no incoming cars from the opposite direction in a few kilometres, the communication device 150 may determine to allow the first vehicle 111 to overtake the vehicle platoon 120 directly, without further intermediate action on the second vehicles of the vehicle platoon 120.

Action 204

In this action, the communication device 150 may determine that a space for overtaking in the vehicle platoon 120 has to be created for the first vehicle 111. That is, the communication device 150 may determine that the overtaking of the vehicle platoon 120 is to be implemented in a step-wise fashion. The communication device 150 may determine that the space has to be created based on at least one of: the obtained information, and the one or more current conditions in the environment of the vehicle platoon 120. The space to be created may also be based on the obtained information. For example, the space to be created may depend on the length of the first vehicle 111. The space to be created may also it depend on the horsepower of the first vehicle 111, since a more powerful car may be able to overtake the whole vehicle platoon 120, depending on the circumstances, whereas a less powerful car may need to overtake the vehicle platoon 120 by first overtaking a few of the second vehicles comprised in the vehicle platoon 120. The communication device 150 may determine that the space has to be created based on one or more characteristics of the vehicle platoon 120, such as for example, the number of second vehicles comprised in the vehicle platoon 120, as well as the length of these vehicles.

In some particular embodiments, wherein the first vehicle 111 is a high priority vehicle, the request from the emergency first vehicle 111 may cause the first communication node 150 to determine that the vehicle platoon 120 create a space, as just described.

This action is optional.

Action 205

In the embodiments wherein it has been determined that the space for overtaking in the vehicle platoon 120 has to be created for the first vehicle 111, in this action, the communication device 150 may determine between which second vehicles 122, 123 in the vehicle platoon 120 the space has to be created, based on at least one of: the obtained information, and the one or more current conditions in the environment of the vehicle platoon 120. That is, on a similar analysis to that performed in Action 204, the communication device 150 may in this action calculate a place in the platoon where an empty space for the first vehicle 111 should be created. Affected platoon members may be those platoon members that may have to adjust their relative distance to the leader of the platoon to create the space for the overtaking vehicle. In the non-limiting example of FIG. 1, the communication device 150 has determined that the space has to be created between the second second vehicle 122 and the third second vehicle 123. However, depending on the characteristics of the first vehicle 111 and the particular circumstances of the moment of the analysis, the communication device 150 may decide the space has to be created in another space, depending on how may second vehicles in the vehicle platoon 120, the first vehicle 111 may be able to overtake at a time.

This action is optional.

Action 206

In some circumstances, more than one approaching vehicle may have expressed the wish to overtake the vehicle platoon 120, or multiple vehicles may be wishing to overtake the vehicle platoon 120 at once. In such circumstances, the communication device 150 may implement a scheduling mechanism. When one or more first vehicles 110 are within a second distance 132 behind the vehicle platoon 120, in this action, the communication device 150 may schedule a time to allow the first vehicle 111 to overtake the vehicle platoon 120. That is, the communication device 150 may repeat actions 201-205 for each one of the one or more first vehicles 110, and decide a time when each of the first vehicles 110 may overtake the vehicle platoon 120, and how, e.g., whether a space is required for each one of them, where the space may need to be created, etc. . . .

This action is optional.

Action 207

In this action, the communication device 150 provides, based on a result of the determining of Action 203, a first indication to at least one of: a) the first radio node 161 in the first vehicle 111, and b) the second radio node 162 in one of the second vehicles 121 in the vehicle platoon 120, to notify the trailing vehicle e.g., upon approach. The first indication may be for example, a message that in this Action is sent or transmitted as a radio signal via one of the first link 171 or the second link 172.

Wherever a providing action is described herein, it will be understood to comprise any of sending directly to the named node, or indirectly to the same node, via one or more intermediate nodes, and therefore via one or more links, that may be wired, or radio links, as appropriate. For example, in this Action 207, the communication device 150 may provide the first indication to the second radio node 162 directly via the second link 172, or via another radio node in the vehicle platoon 120, via a similar link.

In some embodiments, the first indication may be an authorization to the first vehicle 111 to overtake the vehicle platoon 120. In such embodiments, the communication device 150 may e.g., send itself a radio signal to the first radio node 161 in the first vehicle 111 authorizing it to overtake the vehicle platoon 120. The communication device 150 may also be itself located in the last vehicle of the vehicle platoon 120, that is it may be the same as the second radio node 162, and may therefore signal directly to the first vehicle 111, e.g., via the fourth link 192 with the second interface 182, with e.g., an intermittent light blinking on the left side of the last vehicle 124, that it may overtake the vehicle platoon 120. This may be performed when the first vehicle 111 does not have a radio node.

In some embodiments, the first indication may be a request for the last vehicle 124 in the vehicle platoon 120 to signal an authorization to overtake to the first vehicle 111. This may occur, e.g., when the communication device 150 is not located in the last vehicle 124 of the vehicle platoon 120, and the first vehicle 111 does not have a radio node.

In other embodiments, the first indication may be a request for at least one of the second vehicles 123, 124 in the vehicle platoon 120 to create a space for overtaking in the vehicle platoon 120 for the first vehicle 111, the space being based on the obtained information. This may occur, as a result of the determination of Action 204 and/or Action 205, in the embodiments wherein the communication device 150 has performed these actions.

In other embodiments, the first indication may be a signal to the first vehicle 111 to not attempt to overtake the vehicle platoon 120. In such embodiments, the communication device 150 may e.g., send itself a radio signal to the first radio node 161 in the first vehicle 111 instructing it not to overtake the vehicle platoon 120. The communication device 150 may also be itself located in the last vehicle of the vehicle platoon 120, that is it may be the same as the second radio node 162, and may therefore signal directly to the first vehicle 111, for example, via the fourth link 192 with the second interface 182, with e.g., an intermittent light blinking on the right side of the last vehicle 124, that it may not overtake the vehicle platoon 120. This may be performed when the first vehicle 111 does not have a radio node.

In other embodiments, the first indication may be a request for the last vehicle 124 in the vehicle platoon 120 to signal to the first vehicle 111 to not attempt to overtake vehicle platoon 120, in a similar way as just described.

In the examples wherein Action 206 has been performed, the provided first indication may be are based on the scheduled time.

In any of the embodiments above, the first indication may comprise one or more of: a) a time slot allocated for partial or complete overtaking of the vehicle platoon 120, b) a speed to use during overtaking, and c) a position in the vehicle platoon 120 where the slot for overtaking has been created, if the vehicle platoon 120 is too large to overtake at once.

Action 208

In the embodiments wherein Action 203 and Action 204 have been performed, and wherein the first indication is the request for at least one of the second vehicles 123, 124 in the vehicle platoon 120 to create the space, the communication device 150, in this Action, obtains a second indication from at least one of: a) the second radio node 162 and b) a third radio node 163 in one of the second vehicles 123 in the vehicle platoon 120, that the space has been created.

The second indication may be for example, a message that in this Action is sent or transmitted as a radio signal via one of the second link 172 or a link of equivalent description between the communication device 150 and the third radio node 163, e.g., a fifth link.

This action is optional.

Action 209

In the embodiments wherein a space has been created in the vehicle platoon 120, so the first vehicle 111 may first overtake some of the second vehicles in the vehicle platoon 120, in this action, the communication device 150 may provide a third indication, based on the obtained second indication of Action 208. That is, once the communication device 150 receives a notification that the space has been created. The third indication may be for example, a message that in this Action is sent or transmitted as a radio signal via one of the first link 161, the second link 172 or a link of equivalent description between the communication device 150 and the fourth radio node 164, e.g. a sixth link.

The third indication may an authorization to the first radio node 161 in the first vehicle 111 for the first vehicle 111 to take the created space. This may apply for example, in the embodiments wherein the communication device 150 is in direct communication with the first radio node 161.

The third indication may also be a request to at least one of: i) the second radio node 162 and ii) a fourth radio node 164 in one of the second vehicles 124 in the vehicle platoon 120, for one of the vehicles 124 in the vehicle platoon 120 to signal an authorization to take the created space to the first vehicle 111. This may apply for example, in the embodiments wherein the communication device 150 is not located in the vehicle platoon 120, or wherein the first vehicle 111 does not have a radio node, and it may need to be notified by physical means in the last car 124 of the vehicle platoon 120.

In the examples wherein Action 206 has been performed, the provided third indication may be are based on the scheduled time.

This action is optional.

Action 210

In this action, the communication device 150 may obtain a fourth indication, that taking of the created space by the first vehicle 111 is complete from one of: a) the first radio node 161, that is, directly, b) the second radio node 162, for example, from the leader of the vehicle platoon 120 and c) another radio node 163 in one of the second vehicles 123 in the vehicle platoon 120, that is, directly from one of the second vehicles in the vehicle platoon 120 that has direct visual information of the taking of the space.

The fourth indication may be for example, a message that in this Action is sent or transmitted as a radio signal via one of: the first link 171, the second link 172 or a link of equivalent description between the communication device 150 and the third radio node 163, e.g., the fifth link.

This action is optional.

Action 211

In the embodiments wherein a space has been created in the vehicle platoon 120, so the first vehicle 111 may first overtake some of the second vehicles in the vehicle platoon 120, in this action, the communication device 150 may provide a fifth indication to at least one of: i) the second radio node 162 and ii) the third radio node 163 in one of the second vehicles 123 in the vehicle platoon 120, for the at least the one of the second vehicles 123, 124 in the vehicle platoon 120 to close the space, based on the obtained indication.

The fifth indication may be for example, a message that in this Action is sent or transmitted as a radio signal via one of: the first link 171, the second link 172 or a link of equivalent description between the communication device 150 and the third radio node 163, e.g., the fifth link.

This action is optional.

Action 212

Depending on the size, that is, the length of the vehicle platoon 120, as well as other characteristics of the first vehicle 111, e.g., the obtained information, and the one or more current conditions in the environment of the vehicle platoon 120, the communication device 150 any of actions 201-210, as appropriate. For example, in some situations, no space may need to be created, whereas in others, the first vehicle 111 may need to overtake the vehicle platoon 120 in two turns, through the sequential creation and taking of two spaces in the vehicle platoon 120, or more.

Once the first vehicle 111 has overtaken all the vehicles in the vehicle platoon 120, in this action, the communication device 150 may obtain a sixth indication, that an overtaking of the vehicle platoon 120 by the first vehicle 111 is complete from one of: a) the first radio node 161, that is, directly, b) the second radio node 162, for example, from the leader of the vehicle platoon 120 and c) one other radio node 164 in one of the second vehicles 124 in the vehicle platoon 120, that is, directly from one of the second vehicles in the vehicle platoon 120 that has direct information of the taking of the space, e.g., through one or more sensors, in this case that would be the first second vehicle 121 in the vehicle platoon 120, e.g., via a wired link to such one or more sensors.

The sixth indication may be for example, a message that in this Action is sent or transmitted as a radio signal via one of: the first link 171, the second link 172 or a link of equivalent description between the communication device 150 and the fourth radio node 164, e.g., the sixth link.

This action is optional.

In any of the embodiments herein, the communication device 150 may be the same as the second radio node 162. In such instances, it may be understood that any of the first indication, second indication, third indication, fourth indication and/or sixth indication, may be a wired signal.

Figure 3:
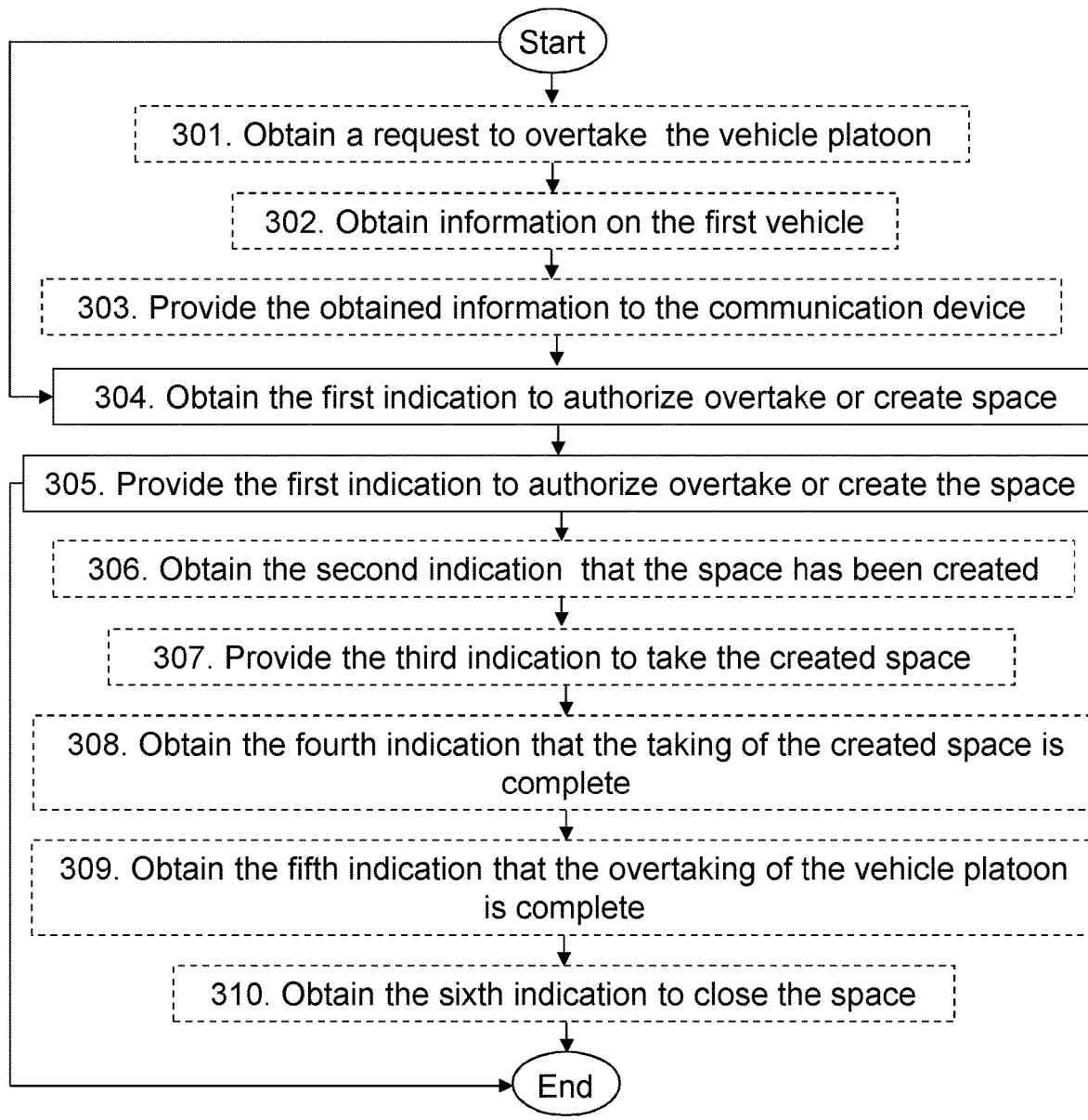
FIG. 3 is a schematic diagram illustrating embodiments of a method in a second radio node, according to some embodiments.

Embodiments of a method performed by the second radio node 162 in one vehicle in the vehicle platoon 120, will now be described with reference to the flowchart depicted in FIG. 3. As stated earlier, the vehicle platoon 120 comprises the two or more second vehicles 121, 122, 123, 124.

The detailed description of some of the following corresponds to the same references provided above, in relation to the actions described for the communication device 150, and will thus not be repeated here.

For example, in some embodiments, the communication device 150 may be the same as the second radio node 162.

Also, all complementary actions to those described in relation to the communication device 150, as performed by the second radio node 162 may not be listed below, to simplify the description, but it will be understood by one in the art that they are performed.

The method may comprise the following actions, which actions may as well be carried out in another suitable order than that described below.

One or more of the actions described below may be performed by the second radio node 162 when for example, the communication device 150 is not a radio node, or when the communication device 150 is not located in the vehicle platoon 120. In such cases, communication between the communication device 150 and the first radio node 161 may occur via the second radio node 162. The second radio node 162 may be for example, located in the leader of the vehicle platoon 120, as depicted in the example of FIG. 1.

Action 301

In this action, the second radio node 162 may obtain the request from the first radio node 161, for the first vehicle 111 to overtake the vehicle platoon 120, e.g., via a radio link between the first radio node 161 and the second radio node 162.

This action is optional.

Action 302

In some embodiments, the second radio node 162, in this action may obtain the information about the first vehicle 111, when the first vehicle 111 is within the first distance 131 behind the vehicle platoon 120. The obtaining is performed in general as described earlier in Action 202.

This action is optional.

Action 303

In this action, the second radio node 162 may provide the obtained information in Action 302 to the communication device 150, e.g., by sending a radio signal or a wired signal comprising the information, e.g. via the second link 172.

This action is optional.

Action 304

In this action, the second radio node 162 obtains the first indication from the communication device 150, e.g. via the second link 172. As stated earlier, the first indication is one of: a) the authorization to the first vehicle 111 within the first distance 131 behind the vehicle platoon 120 to overtake the vehicle platoon 120, b) the request for the last vehicle 124 in the vehicle platoon 120 to signal the authorization to overtake to the first vehicle 111, c) the request for at least one of the second vehicles 123 in the vehicle platoon 120 to create the space for overtaking in the vehicle platoon 120 for the first vehicle 111, d) the signal to the first vehicle 111 to not attempt to overtake the vehicle platoon 120, and e) the request for the last vehicle 124 in the vehicle platoon 120 to signal to the first vehicle 111 to not attempt to overtake vehicle platoon 120.

Action 305

In this action, the second radio node 162 provides the obtained first indication to one of: a) the first radio node 161 in the first vehicle 111, e.g., via a radio link, and b) the third radio node 163 in one of the second vehicles 123, 124 in the vehicle platoon 120, e.g., via respective radio link. For example, if the first vehicle 111 does not have a radio node, the second radio node 162 may instruct the last vehicle 124 in the vehicle platoon 120 to provide a physical signal to the first vehicle 111, e.g., a blinking light to signal an authorization or to signal not to attempt to overtake the vehicle platoon. This may then be implemented via the fourth radio node 164 in the last vehicle 124 in the vehicle platoon 120, which may instruct the second interface 182 over the fourth link 192 to provide the first indication to the first vehicle 111.

Action 306

In this action, and in the embodiments wherein the first indication is the request for at least one of the second vehicles 123, 124 in the vehicle platoon 120 to create the space, the second radio node 162 may obtain the second indication, e.g. via a radio link, from at least one of: a) the third radio node 163, and b) another radio node in one of the second vehicles 123 in the vehicle platoon 110, that the space has been created. That is, the second indication may be received from the radio node located in one of the vehicles that have reduced speed to create the space, or it may be received from any other radio node in the vehicle platoon 120. The second radio node 162 may then provide the second indication to the communication device 150.

This action is optional.

Action 307

In this action, the second radio node 162 may provide the third indication, based on the obtained second indication. The third indication is one of: a) an authorization to the first radio node 161 in the first vehicle 111 for the first vehicle 111 to take created space, and b) a request for a last vehicle 124 in the vehicle platoon 120 to signal an authorization to take the created space to the first vehicle 111. The second radio node 162 may provide the third indication in a similar manner as that described in relation to Action 305.

This action is optional.

Action 308

In this action, the second radio node 162 may obtain the fourth indication, that taking of the created space by the first vehicle 111 is complete, e.g., via a radio link, from one of: a) the first radio node 161 and b) at least the third radio node 163. That taking of the created space by the first vehicle 111 is complete may be detected by one of the second vehicles in the vehicle platoon 120 on either side of the created space, e.g., the third second vehicle 123, detecting the first vehicle 111 through, e.g., one or more sensors in the third second vehicle 123, and by capturing the number plate of the vehicle with e.g., a camera located in the third second vehicle 121. This information may then be obtained by the second radio node 162, via e.g., a wired link.

This action is optional.

Action 309

In this action, the second radio node 162 may obtain the fifth indication, that an overtaking of the vehicle platoon 120 by the first vehicle 111 is complete, e.g., via a radio link, from one of: a) the first radio node 161 and b) at least the fourth radio node 164 in one of the second vehicles 121 in the vehicle platoon 120. The second radio node 162 may autonomously obtain the fifth indication. That the overtaking of the vehicle platoon 110 by the first vehicle 111 is complete may be detected by the second vehicle in the most advanced position of the vehicle platoon 120, e.g., the first second vehicle 121, detecting an overtaking vehicle such as the first vehicle 111 through, e.g., one or more sensors in the first second vehicle 121, and by capturing the number plate of the vehicle with e.g., a camera located in the first second vehicle 121. This information may then be obtained by the second radio node 162 via e.g., a wired link.

This action is optional.

Action 310

In this action, the second radio node 162 may obtain the sixth indication from the communication device 150 for the at least the one of the second vehicles 123 in the vehicle platoon 120 to close the space, based on the obtained indication, e.g., via the second link 172.

This action is optional.

Figure 4:
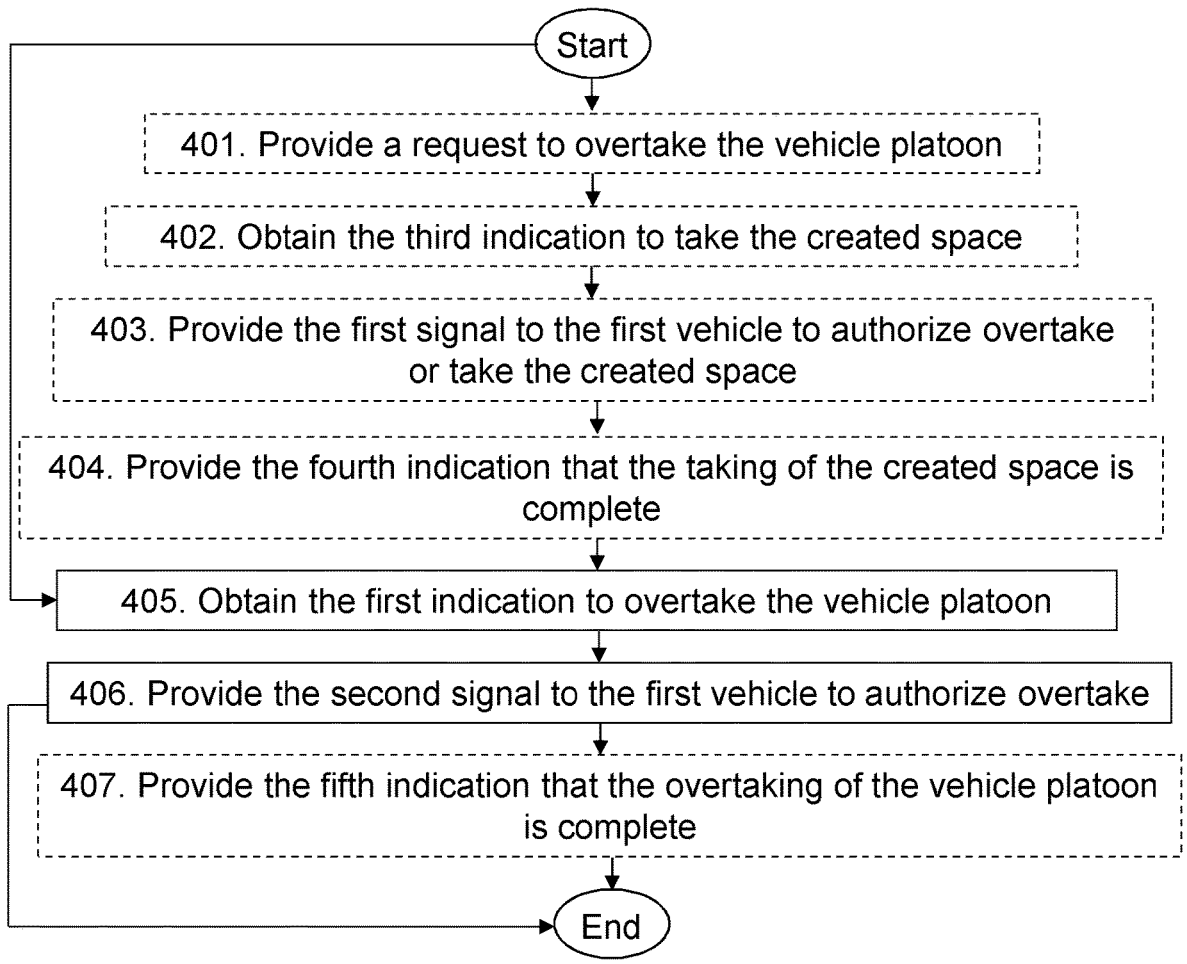
FIG. 4 is a schematic diagram illustrating embodiments of a method in a first radio node, according to some embodiments.

Embodiments of first radio node 161 in the first vehicle 111 for providing to the first vehicle 111 an indication to overtake a vehicle platoon 120, will now be described with reference to the flowchart depicted depicted in FIG. 4. As stated earlier, the vehicle platoon 120 comprises the two or more second vehicles 121, 122, 123, 124.

The detailed description of some of the following corresponds to the same references provided above, in relation to the actions described for the communication device 150, and will thus not be repeated here.

For example, in some embodiments, the communication device 150 may be the same as the second radio node 162.

Also, all complementary actions to those described in relation to the communication device 150, as performed by the first radio node 161 may not be listed below, to simplify the description, but it will be understood by one in the art that they are performed.

The method may comprise the following actions, which actions may as well be carried out in another suitable order than that described below.

Action 401

In this action, the first radio node 161 may provide the request for the first vehicle 111 to overtake the vehicle platoon 120 to one of: a) the communication device 150, e.g., via the first link 171, b) the second radio node 162, e.g., via the second link 172, and c) another radio node 164 in one of the second vehicles 124 in the vehicle platoon 120, e.g., via another radio link.

This action is optional.

Action 402

In some embodiments, the first radio node 161, in this action may obtain the third indication, e.g., via a radio link, wherein the third indication is an authorization for the first vehicle 111 to take the created space, from at least one of: i) the communication device 150, ii) the second radio node 162 and ii) the fourth radio node 164 in one of the second vehicles 124 in the vehicle platoon 120.

This action is optional, as it depends on whether the space may have been created or not.

Action 403

In this action, the first radio node 161 may provide a first signal to the first vehicle 111 to authorize overtake or take the created space. This may be performed by displaying, via the third link 191, a visual and/or auditive signal for the driver of the first vehicle 111 in the first interface 181, e.g., a blinking message on an electronic display on the dashboard of the first vehicle 111, accompanied by a tone.

This action is optional.

Action 404

In this action, the first radio node 161 may provide the fourth indication that the taking of the created space is complete to at least one of: a) the communication device 150, b) the second radio node 162, and c) another radio node 163 in one of the second vehicles 123 in the vehicle platoon 120. This may be performed, e.g., via a corresponding radio link.

Action 405

In this action, the first radio node 161 obtains the first indication, from one of: i) the communication device 150, ii) the last vehicle 124 in the vehicle platoon 120, and iii) the second radio node 162 in one of the second vehicles 121 in the vehicle platoon 120, the first indication being one of: a) the authorization to overtake the vehicle platoon 120, and b) the signal to the first vehicle 111 to not attempt to overtake the vehicle platoon 120. This may be performed, e.g., via a corresponding radio link.

Action 406

In this action, the first radio node 161 provides, to the first vehicle 111, a second signal to overtake the vehicle platoon 120, the providing being based on the obtained first indication. This may be performed by displaying, via the third link 191, a different visual and/or auditive signal for the driver of the first vehicle 111 in the first interface 181, e.g., a different blinking message on an electronic display on the dashboard of the first vehicle 181, accompanied by a different tone.

Action 407

In this action, the first radio node 161 may provide the fifth indication that the overtaking of the vehicle platoon 120 is complete to one of: a) the communication device 150, e.g., via the first link 171, b) the second radio node 162, e.g., via a radio link and c) one other radio node 164 in one of the second vehicles 124 in the vehicle platoon 120, e.g., via another radio link.

This action is optional, as the fifth indication may be provided autonomously by one of the vehicles in the vehicle platoon 120, e.g., the first vehicle in the vehicle platoon 120.

Figure 5:
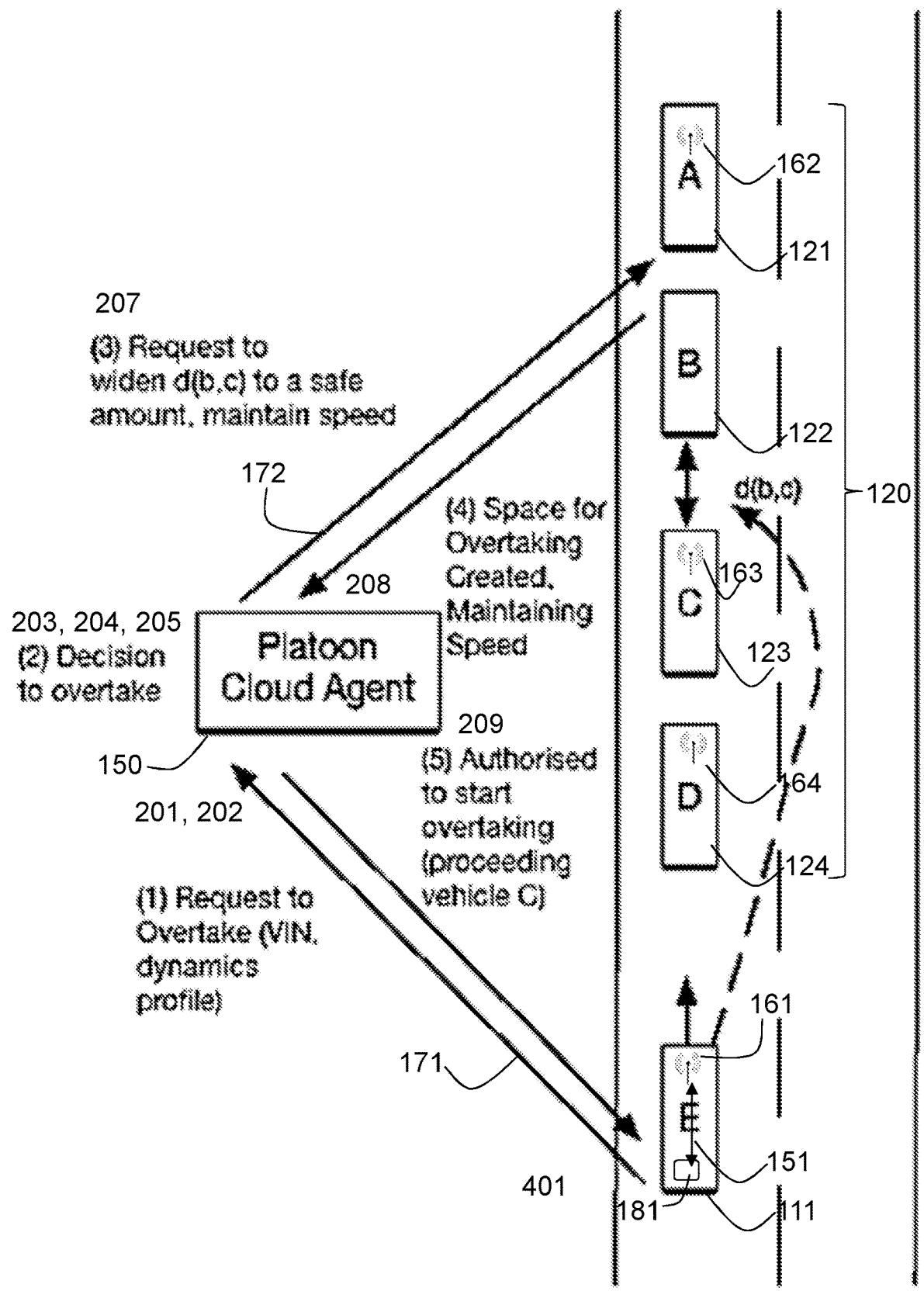
FIG. 5 is a schematic diagram illustrating embodiments of a method in a wireless communications network, according to some embodiments.

According to the methods just described, some embodiments herein relate to overtaking of a vehicle platoon 120 by a first vehicle 111 with radio access, that is, a "connected vehicle". FIG. 5 is a schematic diagram illustrating an example of such embodiments, relating to overtaking of a four-vehicle platoon 120 from an approaching connected vehicle. The first vehicle 111 is also referred to in this figure as vehicle E. In this particular example, the communication device 150 is a cloud agent, referred to in some examples herein as a Platoon Cloud Agent, located outside of the vehicle platoon 120. The Platoon Cloud Agent, is the entity that mediates between the vehicle platoon 120 and the overtaking vehicle and coordinates the process. In the non-limiting example of this figure, the first vehicle 111 initiates the process at (1) by the first radio node 161, in Action 401, sending a request to overtake the vehicle platoon 120, to the Platoon Cloud Agent, over the first link 171. The request is received by the Platoon Cloud Agent in Action 201. The request in this example includes the dynamic profile of the vehicle, its length, speed, acceleration and deceleration capability, traffic priority and distance from the platoon tail, and this is how the Platoon Cloud Agent obtains the information of the first vehicle 111 in Action 202. In Action 203, the platoon cloud agent at (2) analyses, the parameters sent, and in Actions 204 and 205 analyzes the available space needed for overtaking in the platoon. In Action 207, the Platoon Cloud Agent either issues an overtaking command to vehicle E directly over the first link 171, or first instructs some platoon members to make space for vehicle E. Illustrated here is the latter case at (3), wherein a request to widen the distance between the second second vehicle 122 and the third second vehicle 123 (d(b,c)) is sent via the second link 172 to the second radio node 162 in the leader of the vehicle platoon 120, the first second vehicle 121. The second radio node 162 then provides the first indication to the affected platoon members to create the space for the first vehicle 111, according to Action 305. The affected platoon members in this case are the third second vehicle 123 and the fourth second vehicle 124. Affected platoon members slow down to open a gap sufficient for the length of vehicle E to fit in. In other examples, affected platoon members may speed up to create a space for the first vehicle 111, e.g., depending on the one or more conditions. At (4), the Platoon Cloud Agent obtains the second indication that the space has been created as in Action 208 and that the speed is maintained, as sent by the second radio node 162 in this example over the second link 172. As soon as this process is done, the Platoon Cloud Agent authorizes vehicle E to take the created space by providing the third indication to the first radio node 161 in (5) as in Action 209. The first vehicle 111 then proceeds to take the created space d(b,c), as indicated in the Figure by a dashed curved line.

Figure 6:
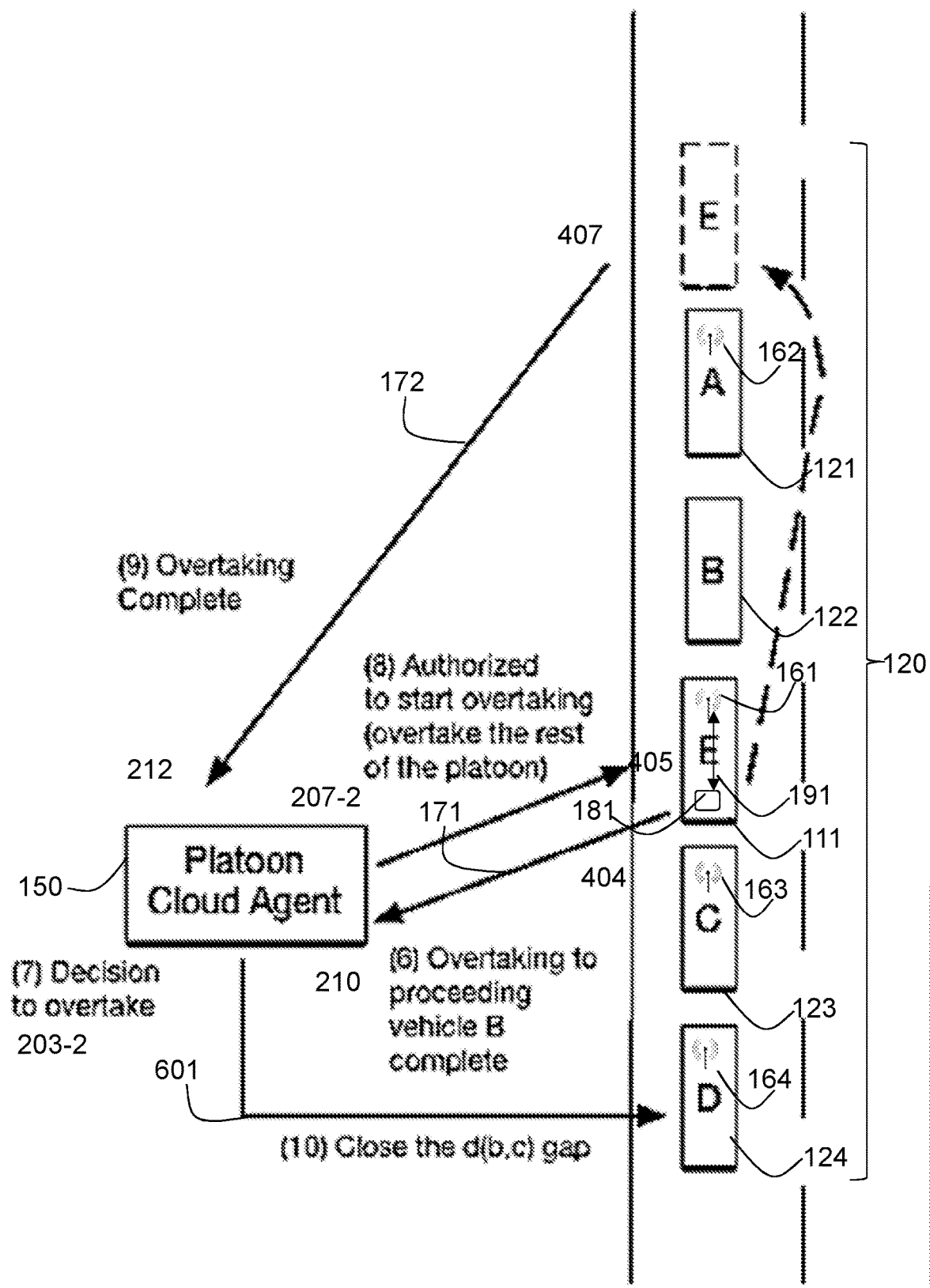
FIG. 6 is a schematic diagram illustrating embodiments of a method in a wireless communications network, according to some embodiments.

FIG. 6 is a continuation of FIG. 5. At (6), the Platoon Cloud Agent obtains the fourth indication that the taking of the created space is complete from the first radio node 161, according to Actions 210 and 404. At (7), the Platoon Cloud Agent repeats Action 203 (203-2) by determining whether to allow the first vehicle to overtake. At (8), the Platoon Cloud Agent repeats Action 207 (207-2) and provides, based on a result of the determining of Action 203, a new first indication to the first radio node 161 authorizing the first vehicle 111 to overtake the rest of the vehicle platoon 120. The first vehicle 111 receives the first indication according to Action 405, and then proceeds overtake the rest of the vehicle platoon (120), as indicated in FIG. 6 by a dashed curved line. At (9), the Platoon Cloud Agent obtains the sixth indication that the overtaking of the vehicle platoon is complete from the first radio node 161, as described in Action 212 and Action 407. When the overtaking is done, the Platoon Cloud Agent, at (10), instructs the affected platoon members to close the gap opened before by providing the fifth indication to close the space as described in Action 211, via a fifth link 601 between the communication device 150 and the fourth radio node 164, which is a radio link in this example. Note that, as exemplified in FIGS. 5, and 6, the order of some of the Actions performed by the different nodes involved may be altered with respect to the order provided in describing Actions 201-212.

Figure 7:
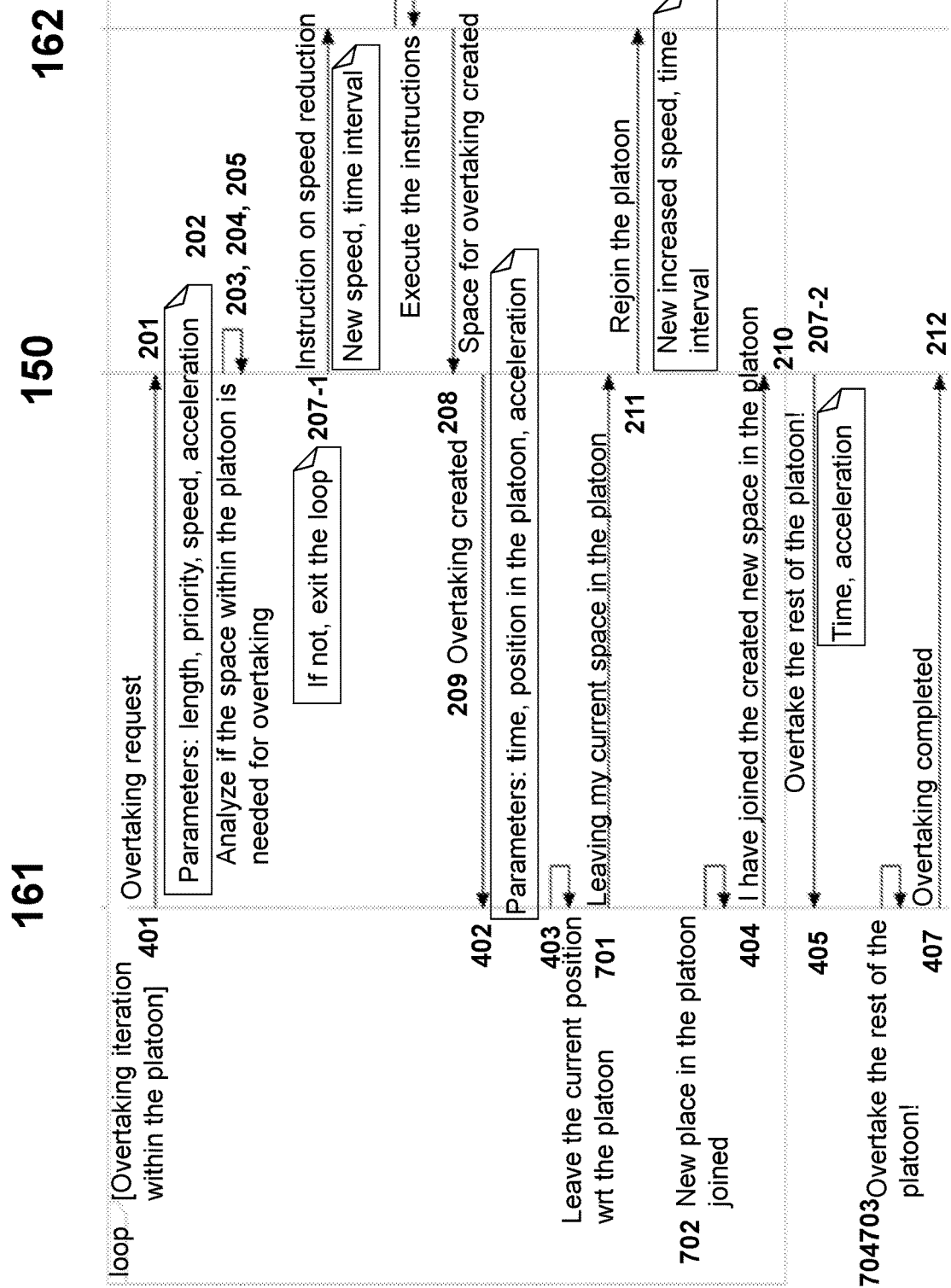
FIG. 7 is a schematic diagram illustrating embodiments of a method in a wireless communications network, according to some embodiments.

FIG. 7 is a schematic diagram illustrating a non-limiting example of a step-wise platoon overtaking mechanism by one vehicle, according to embodiments herein. The Figure depicts the different actions that may be performed by the communication device 150, e.g., a Platoon Cloud Agent, the first radio node 161 in the first vehicle 111, and by the affected platoon members, e.g., through the second radio node 162.

Actions that may be iterated during the overtaking of the platoon in this example are represented within a frame. In Action 401, the first radio node 161 provides the request for the first vehicle 111 to overtake the vehicle platoon 120 to the communication device 150, which obtains it in Action 201. In Action 202, the communication device 150 obtains the information about the first vehicle 111, such as the parameters of length of the vehicle, priority, speed, acceleration, etc, which in this particular example, are comprised in the request received from the first radio node 161. In Action 203, the communication device 150 determines whether to allow the first vehicle 111 to overtake the vehicle platoon 120, and analyses if the space within the vehicle platoon 120 is needed for overtaking in Action 204. If not, the communication device 150 exits the loop. Otherwise, in Action 205, the communication device 150 determines between which second vehicles in the vehicle platoon 120 the space has to be created, and provides the first indication to at the second radio node 162 in one of the second vehicles 121 in the vehicle platoon 120. The first indication is a request for at least one of the second vehicles in the vehicle platoon 120, e.g., the third second vehicle 123, to create a space for the first vehicle 111, and comprises an instruction for deceleration of the third second vehicle 123. The first indication may also comprise a new speed for the third second vehicle 123 and the time interval during which the new speed should be applied. In Action 304, the second radio node 162 obtains the first indication. In Action 305, the second radio node 162 executes the received instruction by either providing the obtained first indication to the third radio node 163 in the third second vehicles 123, or by instructing a vehicle in the vehicle platoon directly to execute them, e.g., if the second radio node 162 is located in the same second vehicle that needs to execute the instructions. In Action 306, the second radio node 162 obtains the second indication from the third radio node 163, that the space has been created, and it provides it to the communication node 150, which obtains it in Action 208. The communication device 150 then provides the third indication, to the first radio node 161 as an authorization for the first vehicle 111 to take the created space. This is received by the first radio node 161 in Action 402. The third indication comprises in this example parameters to be applied by, or recommended to, the first vehicle 111 during the overtake such as a time to initiate the overtake, a position in the platoon to occupy, distance that has to be traversed in order to occupy the designated position between platoon vehicles, and the acceleration that should be taken. In Action 403, the first radio node 161 provides the first signal to the first vehicle 111 to leave the current position with respect to the platoon. At 701, the first radio node 161 provides an indication to the communication device 150 that the first vehicle 111 is leaving its current space with respect to the platoon. In Action 211, the communication device 150 provides the fifth indication to the second radio node 162 for the at least the one of the second vehicles 123, 124 in the vehicle platoon 120 to rejoin the platoon. In Action 310, the second radio node 162 receives the fifth indication, which may comprise a new increased speed for the one or more second vehicles 123, 124 that need to close the space, and time interval during which the new increased speed should be applied. In Action 404, the first radio node 161 provides the fourth indication that the taking of the created space is complete to the communication device 150, which is received by the communication device 150 in Action 210. In a new or second Action 207, the communication device 150 provides a new or second first indication to the first radio node 161, in this case comprising an instruction to overtake the rest of the platoon 120. This new or second instruction may comprise the parameters of acceleration, and time for the acceleration that may be applied by the first vehicle 111, that is, that may be recommended to it or that may be instructed to it. At 704, the first radio node 161 may provide a further indication to the first interface 181 of the first vehicle 161 to overtake the rest of the vehicle platoon 120. In Action 407, the first radio node 161, provides the fifth indication to the communication device 150 that the overtaking of the vehicle platoon 120 is complete.

Figure 8:
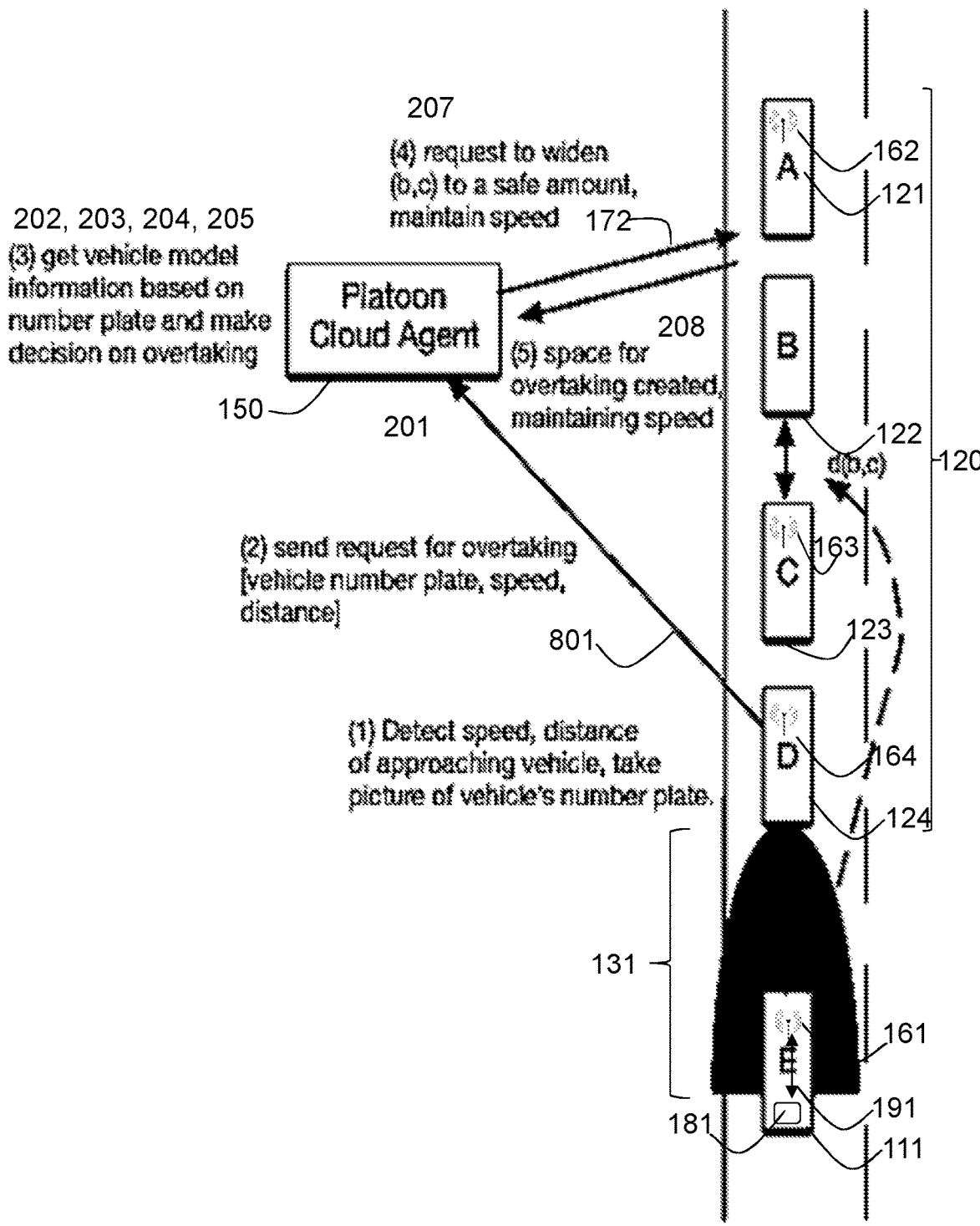
FIG. 8 is a schematic diagram illustrating embodiments of a method in a wireless communications network, according to some embodiments.

According to the methods just described, some embodiments herein relate to overtaking of a vehicle platoon 120 by a first vehicle 111 without radio access. FIG. 8 is a schematic diagram illustrating an example of such embodiments, relating to the overtaking by a vehicle that has no connection to the communication device 150, which in this non-limiting example is a cloud agent. In (1), the fourth radio node 164 located in the last vehicle 124 in the vehicle platoon 120 obtains information about the first vehicle 111, when the first vehicle 111 is within the first distance 131 behind the vehicle platoon 120. The first distance 131 may also be an area behind the vehicle platoon 120, corresponding, for example, to a coverage area by one or more sensors located in the last vehicle 124 in the vehicle platoon 120. This area is represented in FIG. 8 by a black semi oval, which is understood to continue over the first vehicle 111. The fourth radio node 164 obtains the information by detecting the speed, distance of the first vehicle 111, as well as by taking a picture of the number plate of the first vehicle 111. In this particular example, since the first vehicle 111 does not comprise the first radio node 161, it is the fourth radio node 164 located in the last vehicle 124 in the vehicle platoon 120 that at (2) sends a request for overtaking to the communication device 150 via a sixth link 801 between the fourth radio node 164 and the communication device 150, which is a radio link in this example. The request comprises the vehicle number on the plate, the speed and the distance of the first vehicle 111. The request is received by the communication device 150 in Action 201. In Action 202, the communication device 150, at (3) obtains the information about the first vehicle 111 from the received information from the fourth radio node 164, and by retrieving the vehicle model information based on the number plate, from a database connected to the communication device 150. In Action 203, the communication device 150 determines whether to allow the first vehicle 111 to overtake the vehicle platoon 120 based on the obtained information. In Action 204, the communication device 150 determines that a space for overtaking in the vehicle platoon 120 has to be created for the first vehicle 111. In Action 205, the communication device 150 determines that the space (d(b,c)) has to be created between the second second vehicle 122 and the third second vehicle 123 in the vehicle platoon 120. At (4), the communication device 150 sends the first indication to the second radio node 162 via the second link 172, according to Action 207, as a request for at least one of the second vehicles 123, 124 in the vehicle platoon 120 to create a space for overtaking in the vehicle platoon 120 for the first vehicle 111 between the second and third second vehicles 122, 123. At (5), the communication device 150, according to Action 207, receives the second indication from the second radio node 162 the space has been created and that speed is maintained. An approved overtaking command to the overtaking first vehicle 111 is also indicated to the first vehicle 111 through physical means, e.g. by activating the right side blinker if driving on the right side of the road or left side blinker if driving on the left side of the road, as described in Action 307. The first vehicle 111 may then occupy the created space. The process may continue as described above, until the first vehicle overtakes the whole vehicle platoon 120.

Figure 9:
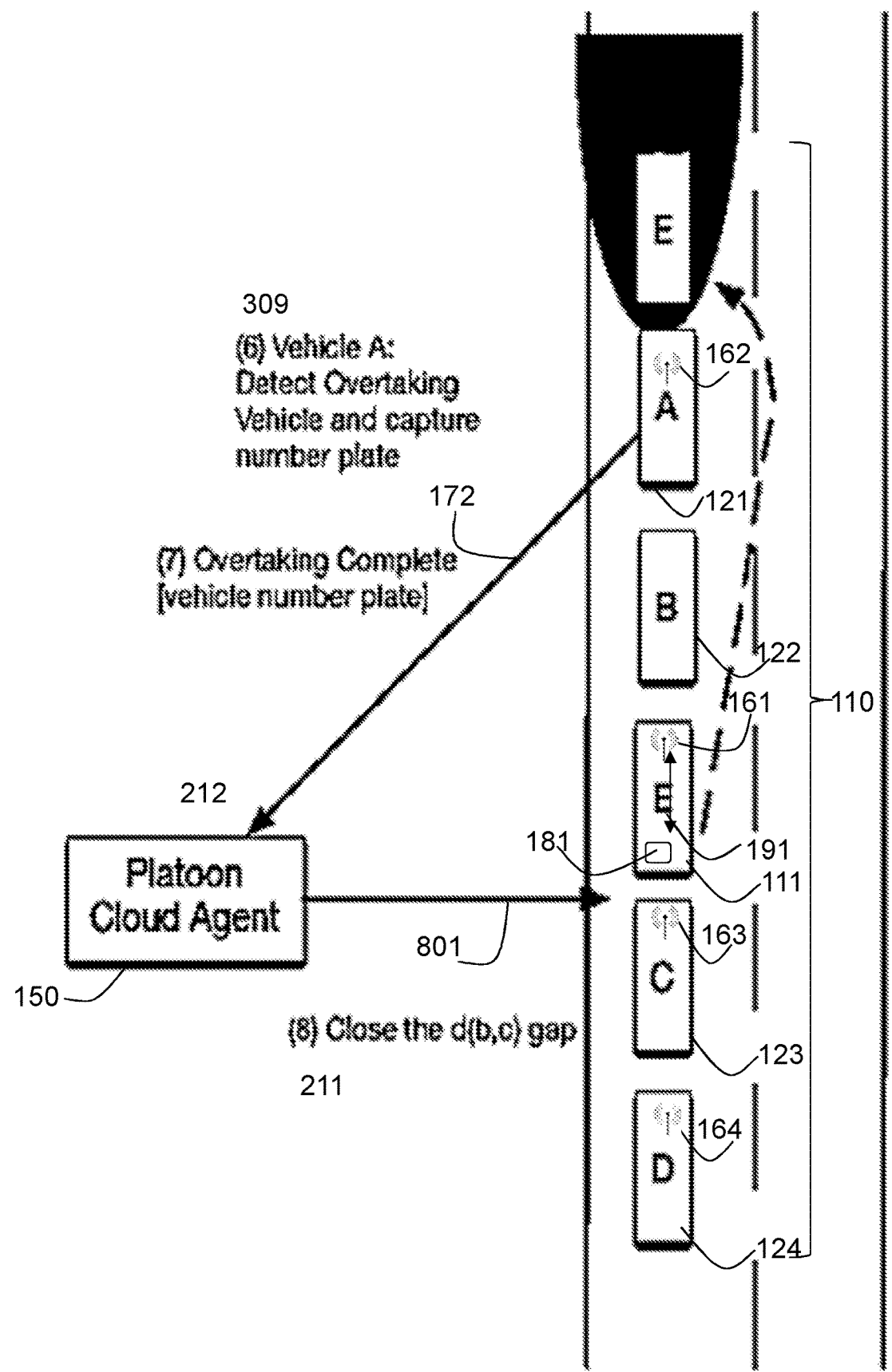
FIG. 9 is a schematic diagram illustrating embodiments of a method in a wireless communications network, according to some embodiments.

FIG. 9 is a continuation of FIG. 8. At (6), the second radio node 162 autonomously obtains the fifth indication, that the overtaking of the vehicle platoon 110 by the first vehicle 111 is complete, as in Action 309. In this example, the fifth indication is obtained by detecting an overtaking vehicle through one or more sensors in the first second vehicle 121, and by capturing the number plate of the vehicle with e.g., a camera located in the first second vehicle 121. At (7), the communication device 150 obtains the sixth indication, that the overtaking of the vehicle platoon 120 by the first vehicle 111 is complete from the second radio node 162, according to Action 212. At (8), the communication device 150 provides the fifth indication to the third radio node 163 in the third second vehicle 123 in the vehicle platoon 120, for the at least the third second vehicle 123 and the fourth second vehicle 124 in the vehicle platoon 120 to close the space, as described in Action 211, via the sixth link 801.

To summarize the foregoing, embodiments herein relate to a mechanism for one or more vehicles to overtake a platoon in a safe manner. Embodiments herein cover and are valid, that is, they may be applied, for any type of vehicle. Particular embodiments herein may relate to a step-wise overtaking mechanism which comprises creating temporary space within the platoon by splitting up and remerging of platooned vehicles, to ensure a safe overtake.

An advantage of embodiments herein is that they allow for a formation of a vehicle platoon potentially including a large number of vehicles. Vehicle platoons covered herein may split up and remerge in order to create space for the overtaking vehicle(s), which is not possible by static vehicle platooning.

Another advantage of embodiments herein is that they allow for a safe overtaking of a vehicle platoon. By using such an approach, it is safe for trailing vehicles to safely overtake a vehicle platoon.

Yet another advantage of embodiments herein is that they are immediately applicable, with a radio node, such as a cellular modem, e.g., LTE, LTE-Advanced, 3G, on all vehicles in the vehicle platoon, and a notification interface which may notify the trailing vehicle when it is safe to start overtaking all or part of the vehicle platoon in front, as described herein.

A further advantage of embodiments herein is that they benefit the society at large by enabling forming of platoons without the concern of the effect they may have in oncoming traffic, especially in cases of prioritization of critical traffic, e.g., police cars, ambulances, fire brigade trucks, etc. . . .

To perform the method actions described above in relation to FIGS. 2 and 5-9, the communication device 150 is configured to determine whether to allow the first vehicle 111 to overtake the vehicle platoon 120. The vehicle platoon 120 comprises the two or more second vehicles 121, 122, 123, 124. The communication device 150 comprises the following arrangement depicted in FIG. 10. As already mentioned, the communication device 150 is configured to operate in the wireless communications network 140.

The detailed description of some of the following corresponds to the same references provided above, in relation to the actions described for the communication device 150, and will thus not be repeated here.

For example, the communication device 150 may be the same as the second radio node 162.

The communication device 150 is further configured to, e.g., by means of an obtaining module 1001 configured to, obtain the information about the first vehicle 111, when the first vehicle 111 is within the first distance 131 behind the vehicle platoon 120.

The obtaining module 1001 may be a processor 1005 of the communication device 150.

The first indication may be one of: a) the authorization to the first vehicle 111 to overtake the vehicle platoon 120, b) the request for the last vehicle 124 in the vehicle platoon 120 to signal the authorization to overtake to the first vehicle 111, c) the request for at least one of the second vehicles 123, 124 in the vehicle platoon 120 to create the space for overtaking in the vehicle platoon 120 for the first vehicle 111, the space being based on the obtained information, d) the signal to the first vehicle 111 to not attempt to overtake the vehicle platoon 120, and e) the request for the last vehicle 124 in the vehicle platoon 120 to signal to the first vehicle 111 to not attempt to overtake vehicle platoon 120.

In some embodiments, wherein the first indication is the request for at least one of the second vehicles 122, 123 in the vehicle platoon 120 to create the space, the communication device 150 may be further configured to, e.g., by means of the obtaining module 1001 configured to, obtain the second indication from at least one of: a) the second radio node 162 and b) the third radio node 163 in one of the second vehicles 123 in the vehicle platoon 120, that the space has been created.

In some embodiments, the communication device 150 may be further configured to, e.g., by means of the obtaining module 1001 configured to, obtain the request from the first radio node 161, for the first vehicle 111 to overtake the vehicle platoon 120, wherein the obtaining of the information is based on the obtained request.

In some embodiments, the communication device 150 may be further configured to, e.g., by means of the obtaining module 1001 configured to, obtain the fourth indication, that taking of the created space by the first vehicle 111 is complete from one of: a) the first radio node 161, b) the second radio node 162 and c) another radio node 163 in one of the second vehicles 123 in the vehicle platoon 120.

In some embodiments, the communication device 150 may be further configured to, e.g., by means of the obtaining module 1001 configured to, obtain the fifth indication, that the overtaking of the vehicle platoon 120 by the first vehicle 111 is complete from one of: a) the first radio node 161, b) the second radio node 162 and c) one other radio node 164 in one of the second vehicles 124 in the vehicle platoon 120.

The communication device 150 is further configured to, e.g., by means of a determining module 1002 configured to, determine whether to allow the first vehicle 111 to overtake the vehicle platoon 120 based on the obtained information.

The determining module 1002 may be the processor 1005 of the communication device 150.

The communication device 150 may be further configured to, e.g., by means of the determining module 1002 configured to, whether to allow the first vehicle 111 to overtake the vehicle platoon 120 based on the one or more current conditions in the environment of the vehicle platoon 120.

In some embodiments, wherein the first indication is the request for at least one of the second vehicles 123, 124 in the vehicle platoon 120 to create the space for overtaking, the communication device 150 may be further configured to, e.g., by means of the determining module 1002 configured to, determine that the space has to be created, based on at least one of: the obtained information, and one or more current conditions in an environment of the vehicle platoon 120.

In some embodiments, wherein the first indication is the request for at least one of the second vehicles 123, 124 in the vehicle platoon 120 to create the space for overtaking, the communication device 150 may be further configured to, e.g., by means of the determining module 1002 configured to, determine between which second vehicles 123, 124 in the vehicle platoon 120 the space has to be created, based on at least one of:
the obtained information, and the one or more current conditions in the environment of the vehicle platoon 120.

The communication device 150 is further configured to, e.g., by means of a providing module 1003 configured to, provide, based on the result of the determining, the first indication to at least one of: a) the first radio node 161 in the first vehicle 111, and b) the second radio node 162 in one of the second vehicles 121 in the vehicle platoon 120.

The determining module 1002 may be the processor 1005 of the communication device 150.

In some embodiments, the communication device 150 may be further configured to, e.g., by means of the providing module 1003 configured to, provide the third indication, based on the obtained second indication, wherein the third indication is one of: a) the authorization to the first radio node 161 in the first vehicle 111 for the first vehicle 111 to take the created space, and b) the request to at least one of: i) the second radio node 162 and ii) the fourth radio node 164 in one of the second vehicles 124 in the vehicle platoon 120, for one of the vehicles 124 in the vehicle platoon 120 to signal the authorization to take the created space to the first vehicle 111.

In some embodiments, the communication device 150 may be further configured to, e.g., by means of the providing module 1003 configured to, provide the sixth indication to at least one of: i) the second radio node 162 and ii) the third radio node 163 in one of the second vehicles 123 in the vehicle platoon 120, for the at least the one of the second vehicles 123, 124 in the vehicle platoon 120 to close the space, based on the obtained indication.

The communication device 150 may be further configured to, e.g., by means of a scheduling module 1004 configured to, schedule the time to allow the first vehicle 111 to overtake the vehicle platoon 120 when one or more first vehicles 110 are within the second distance behind the vehicle platoon 120, wherein at least one of the provided first indication and third indication are based on the scheduled time.

The scheduling module 1004 may be the processor 1005 of the communication device 150.

Figure 10:
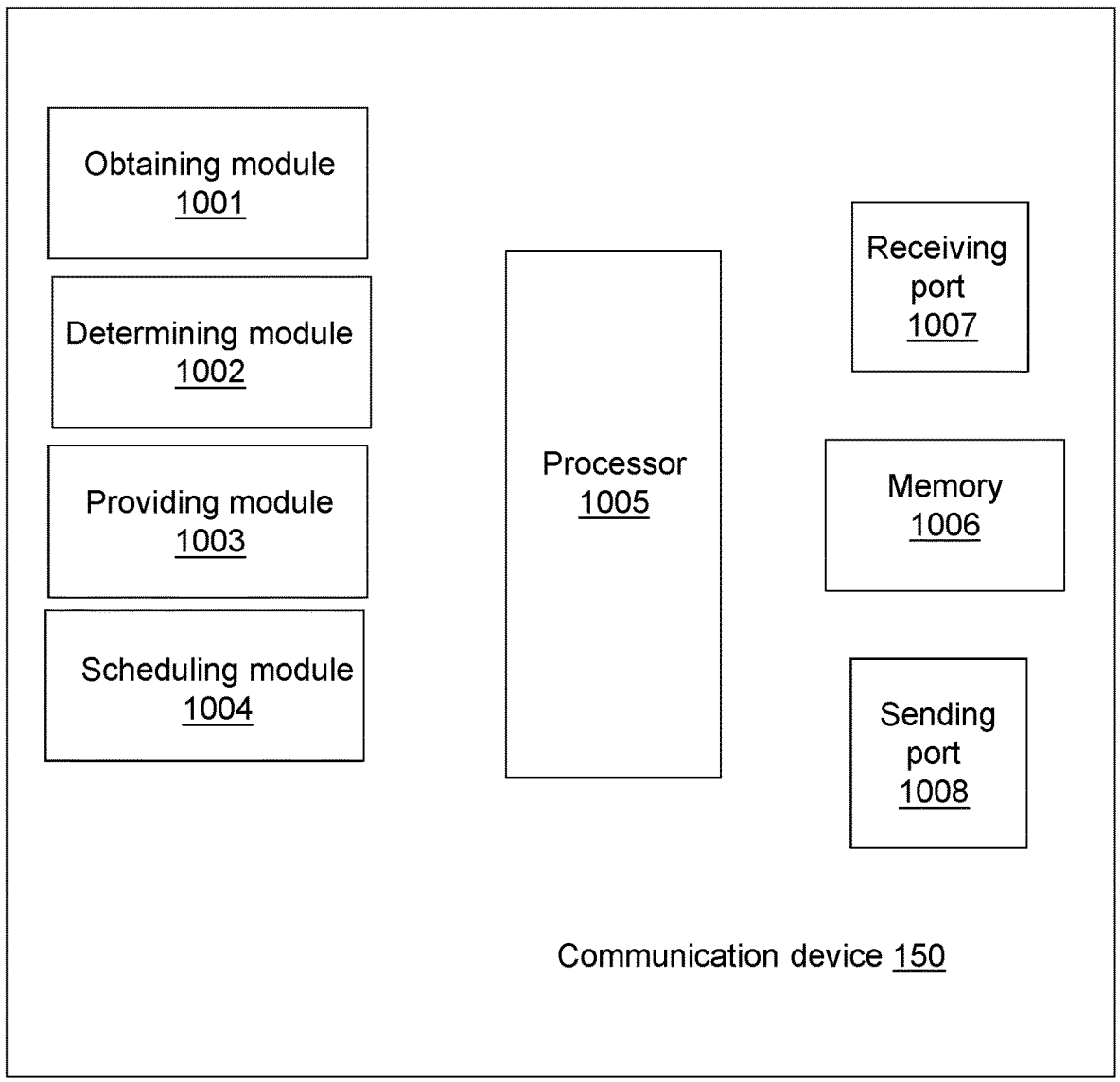
FIG. 10 is a block diagram illustrating embodiments of a communication device, according to some embodiments.

The embodiments herein to determine whether to allow the first vehicle 111 to overtake the vehicle platoon 120 may be implemented through one or more processors, such as the processor 1005 in the communication device 150 depicted in FIG. 10, together with computer program code for performing the functions and actions of the embodiments herein. The program code mentioned above may also be provided as a computer program product, for instance in the form of a data carrier carrying computer program code for performing the embodiments herein when being loaded into the in the communication device 150. One such carrier may be in the form of a CD ROM disc. It is however feasible with other data carriers such as a memory stick. The computer program code may furthermore be provided as pure program code on a server and downloaded to the communication device 150. The computer program code may also be provided as a service from the cloud. As indicated above, the processor 1005 may comprise one or more circuits, which may also be referred to as one or more modules in some embodiments, each configured to perform the actions carried out by the communication device 150, as described above in reference to FIG. 10, e.g., the obtaining module 1001, the determining module 1002, the providing module 1003 and the scheduling module 1004. Hence, in some embodiments, the obtaining module 1001, the determining module 1002, the providing module 1003 and the scheduling module 1004 described above may be implemented as one or more applications running on one or more processors such as the processor 1005. That is, the methods according to the embodiments described herein for the communication device 150 may be respectively implemented by means of a computer program product, comprising instructions, i.e., software code portions, which, when executed on at least one processor, cause the at least one processor to carry out the actions described herein, as performed by the communication device 150. The computer program product may be stored on a computer-readable storage medium. The computer-readable storage medium, having stored thereon the computer program, may comprise instructions which, when executed on at least one processor, cause the at least one processor to carry out the actions described herein, as performed by the communication device 150. In some embodiments, the computer-readable storage medium may be a non-transitory computer-readable storage medium, such as a CD ROM disc, a memory stick, or stored in the cloud space.

In other embodiments, the computer program product may be stored on a carrier containing the computer program, wherein the carrier is one of an electronic signal, optical signal, radio signal, or the computer-readable storage medium, as described above.

The communication device 150 may further comprise a memory 1006 comprising one or more memory units. The memory 1006 may be arranged to be used to store obtained information, such as the information received by the processor 1005, store data configurations, schedulings, and applications etc. to perform the methods herein when being executed in the communication device 150. Memory 1006 may be in communication with the processor 1005. Any of the other information processed by the processor 1005 may also be stored in the memory 1006.

In some embodiments, information e.g., from the second radio node 162 or the first radio node 161, may be received through a receiving port 1007. The receiving port 1007 may be in communication with the processor 1005. The receiving port 1007 may also be configured to receive other information.

The processor 1005 may be further configured to send messages, e.g., to the second radio node 162 or the first radio node 161, through a sending port 1008, which may be in communication with the processor 1005, and the memory 1006.

Those skilled in the art will also appreciate that the any module within the communication device 150, e.g., the obtaining module 1001, the determining module 1002, the providing module 1003 and the scheduling module 1004 described above, may refer to a combination of analog and digital circuits, and/or one or more processors configured with software and/or firmware, e.g. stored in the memory, that when executed by the one or more processors such as the processor 1005, perform actions as described above, in relation to FIGS. 2 and 5-9. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

To perform the method actions described above in relation to FIGS. 3, and 5-9, the second radio node 162 is configured to be located in one vehicle in the vehicle platoon 120. The second radio node 162 comprises the following arrangement depicted in FIG. 11. As already mentioned, the second radio node 162 is configured to operate in the wireless communications network 140. The vehicle platoon 120 comprises two or more second vehicles 121, 122, 123, 124.

The detailed description of some of the following corresponds to the same references provided above, in relation to the actions described for the second radio node 162, and will thus not be repeated here.

For example, the communication device 150 may be the same as the second radio node 162.

The second radio node 162 is further configured to, e.g., by means of an obtaining module 1101 configured to, obtain the first indication from the communication device 150, the first indication being one of: a) the authorization to the first vehicle 111 within the first distance 131 behind the vehicle platoon 120 to overtake the vehicle platoon 120, b) the request for the last vehicle 124 in the vehicle platoon 120 to signal the authorization to overtake to the first vehicle 111, c) the request for at least one of the second vehicles 123 in the vehicle platoon 120 to create the space for overtaking in the vehicle platoon 120 for the first vehicle 111, d) the signal to the first vehicle 111 to not attempt to overtake the vehicle platoon 120, and e) the request for the last vehicle 124 in the vehicle platoon 120 to signal to the first vehicle 111 to not attempt to overtake the vehicle platoon 120.

The obtaining module 1101 may be a processor 1103 of the second radio node 162.

In some embodiments, the second radio node 162 may be further configured to, e.g., by means of the obtaining module 1101 configured to, obtain the request from the first radio node 161, for the first vehicle 111 to overtake the vehicle platoon 120.

In some embodiments, the second radio node 162 may be further configured to, e.g., by means of the obtaining module 1101 configured to, obtain the information about the first vehicle 111, when the first vehicle 111 is within the first distance 131 behind the vehicle platoon 120.

In some embodiments, wherein the first indication is the request for at least one of the second vehicles 123, 124 in the vehicle platoon 120 to create the space, the second radio node 162 may be further configured to, e.g., by means of the obtaining module 1101 configured to obtain the second indication from at least one of: a) the third radio node 163, and b) another radio node in one of the second vehicles 123 in the vehicle platoon 110, that the space has been created.

In some embodiments, the second radio node 162 may be further configured to, e.g., by means of the obtaining module 1101 configured to, obtain the fourth indication, that taking of the created space by the first vehicle 111 is complete from one of: a) the first radio node 161 and b) at least the third radio node 163.

In some embodiments, the second radio node 162 may be further configured to, e.g., by means of the obtaining module 1101 configured to, obtain the fifth indication, that an overtaking of the vehicle platoon 110 by the first vehicle 111 is complete, from one of: a) the first radio node 161 and b) at least the fourth radio node 164 in one of the second vehicles 121 in the vehicle platoon 120.

In some embodiments, the second radio node 162 may be further configured to, e.g., by means of the obtaining module 1101 configured to, obtain the sixth indication from the communication device 150 for the at least the one of the second vehicles 123 in the vehicle platoon 120 to close the space, based on the obtained indication.

The second radio node 162 is further configured to, e.g., by means of a providing module 1102 configured to, provide the obtained first indication to one of: a) the first radio node 161 in the first vehicle 111, and b) the third radio node 163 in one of the second vehicles 123, 124 in the vehicle platoon 120.

The providing module 1102 may be the processor 1103 of the second radio node 162.

In some embodiments, the second radio node 162 may be further configured to, e.g., by means of the providing module 1102 configured to, provide the obtained information to the communication device 150.

In some embodiments, the second radio node 162 may be further configured to, e.g., by means of the providing module 1102 configured to, provide the third indication, based on the obtained second indication. The third indication may be one of: a) the authorization to the first radio node 161 in the first vehicle 111 for the first vehicle 111 to take created space, and b) the request for a last vehicle 124 in the vehicle platoon 120 to signal the authorization to take the created space to the first vehicle 111.

Figure 11:
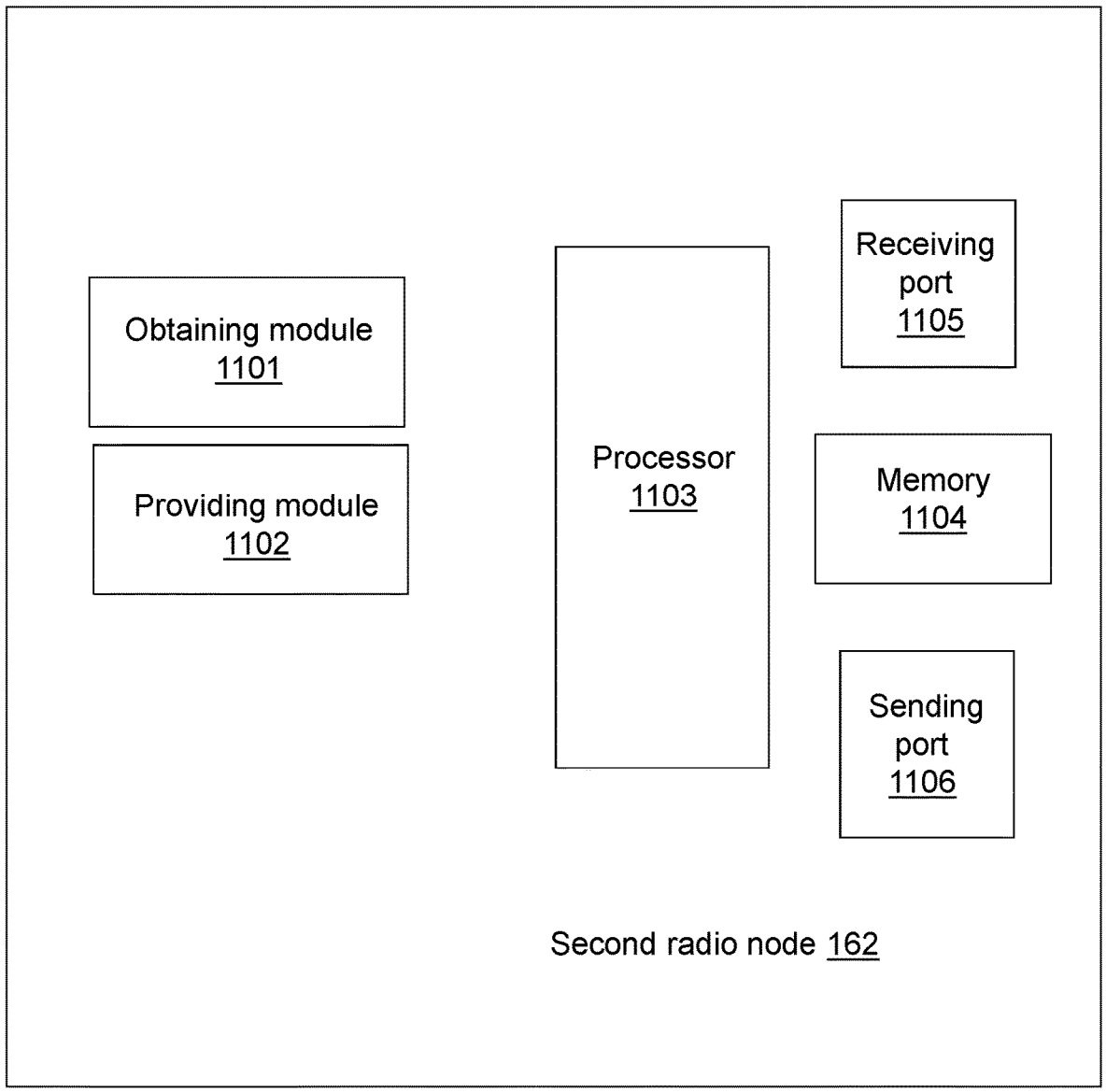
FIG. 11 is a block diagram illustrating embodiments of a second radio node, according to some embodiments.

The embodiments herein for the actions performed by the second radio node 162 may be implemented through one or more processors, such as the processor 1103 in the second radio node 162 depicted in FIG. 11, together with computer program code for performing the functions and actions of the embodiments herein. The program code mentioned above may also be provided as a computer program product, for instance in the form of a data carrier carrying computer program code for performing the embodiments herein when being loaded into the in the second radio node 162. One such carrier may be in the form of a CD ROM disc. It is however feasible with other data carriers such as a memory stick. The computer program code may furthermore be provided as pure program code on a server and downloaded to the second radio node 162. The computer program code may also be provided as a service from the cloud. As indicated above, the processor 1103 may comprise one or more circuits, which may also be referred to as one or more modules in some embodiments, each configured to perform the actions carried out by the second radio node 162, as described above in reference to FIG. 11, e.g., the obtaining module 1101 and the providing module 1102. Hence, in some embodiments, the obtaining module 1101 and the providing module 1102 described above may be implemented as one or more applications running on one or more processors such as the processor 1103. That is, the methods according to the embodiments described herein for the second radio node 162 may be respectively implemented by means of a computer program product, comprising instructions, i.e., software code portions, which, when executed on at least one processor, cause the at least one processor to carry out the actions described herein, as performed by the second radio node 162. The computer program product may be stored on a computer-readable storage medium. The computer-readable storage medium, having stored thereon the computer program, may comprise instructions which, when executed on at least one processor, cause the at least one processor to carry out the actions described herein, as performed by the second radio node 162. In some embodiments, the computer-readable storage medium may be a non-transitory computer-readable storage medium, such as a CD ROM disc, a memory stick, or stored in the cloud space. In other embodiments, the computer program product may be stored on a carrier containing the computer program, wherein the carrier is one of an electronic signal, optical signal, radio signal, or the computer-readable storage medium, as described above.

The second radio node 162 may further comprise a memory 1104 comprising one or more memory units. The memory 1104 may be arranged to be used to store obtained information, such as the information received by the processor 1103, store data configurations, schedulings, and applications etc. to perform the methods herein when being executed in the second radio node 162. Memory 1104 may be in communication with the processor 1103. Any of the other information processed by the processor 1103 may also be stored in the memory 1104.

In some embodiments, information e.g., from the communication device 150 or the first radio node 161, may be received through a receiving port 1105. The receiving port 1105 may be in communication with the processor 1103. The receiving port 1105 may also be configured to receive other information.

The processor 1103 may be further configured to send messages, e.g., to the communication device 150 or the first radio node 161, through a sending port 1106, which may be in communication with the processor 1103, and the memory 1104.

Those skilled in the art will also appreciate that the any module within the second radio node 162, e.g., the obtaining module 1101 and the providing module 1102 described above, may refer to a combination of analog and digital circuits, and/or one or more processors configured with software and/or firmware, e.g. stored in the memory, that when executed by the one or more processors such as the processor 1103, perform actions as described above, in relation to FIGS. 3, and 5-9. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

To perform the method actions described above in relation to FIGS. 4-9, the first radio node 161 is configured to be located in the first vehicle 111 for providing to the first vehicle 111 the indication to overtake the vehicle platoon 120. The first radio node 161 comprises the following arrangement depicted in FIG. 12. As already mentioned, the first radio node 161 is configured to operate in the wireless communications network 140. The vehicle platoon 120 comprises two or more second vehicles 121, 122, 123, 124.

The detailed description of some of the following corresponds to the same references provided above, in relation to the actions described for the first radio node 161, and will thus not be repeated here.

For example, the communication device 150 may be the same as the second radio node 162.

The first radio node 161 is further configured to, e.g., by means of an obtaining module 1201 configured to, obtain the first indication, from one of: i) the communication device 150, ii) the last vehicle 124 in the vehicle platoon 120, and iii) the second radio node 162 in one of the second vehicles 121 in the vehicle platoon 120, the first indication being one of: a) the authorization to overtake the vehicle platoon 120, and b) the signal to the first vehicle 111 to not attempt to overtake the vehicle platoon 120.

The obtaining module 1201 may be a processor 1203 of the first radio node 161.

In some embodiments, the first radio node 161 may be further configured to, e.g., by means of the obtaining module 1201 configured to, obtain the third indication, wherein the third indication is the authorization for the first vehicle 111 to take the created space, from at least one of: i) the communication device 150, ii) the second radio node 162 and ii) the fourth radio node 164 in one of the second vehicles 124 in the vehicle platoon 120.

The first radio node 161 is further configured to, e.g., by means of a providing module 1202 configured to, provide, to the first vehicle 111, the second signal to overtake the vehicle platoon 120, the providing being based on the obtained first indication.

The providing module 1202 may be the processor 1203 of the first radio node 161.

In some embodiments, the first radio node 161 may be further configured to, e.g., by means of the providing module 1202 configured to, provide the request for the first vehicle 111 to overtake the vehicle platoon 120 to one of: a) the communication device 150, b) the second radio node 162, and c) another radio node 164 in one of the second vehicles 124 in the vehicle platoon 120.

In some embodiments, the first radio node 161 may be further configured to, e.g., by means of the providing module 1202 configured to, provide the first signal to the first vehicle 111 to authorize overtake or take the created space.

In some embodiments, the first radio node 161 may be further configured to, e.g., by means of the providing module 1202 configured to, provide the fourth indication that the taking of the created space is complete to at least one of: a) the communication device 150, b) the second radio node 162, and c) another radio node 163 in one of the second vehicles 123 in the vehicle platoon 120.

In some embodiments, the first radio node 161 may be further configured to, e.g., by means of the providing module 1202 configured to, provide the fifth indication that the overtaking of the vehicle platoon 120 is complete to one of: a) the communication device 150, b) the second radio node 162, and c) one other radio node 164 in one of the second vehicles 124 in the vehicle platoon 120.

Figure 12:
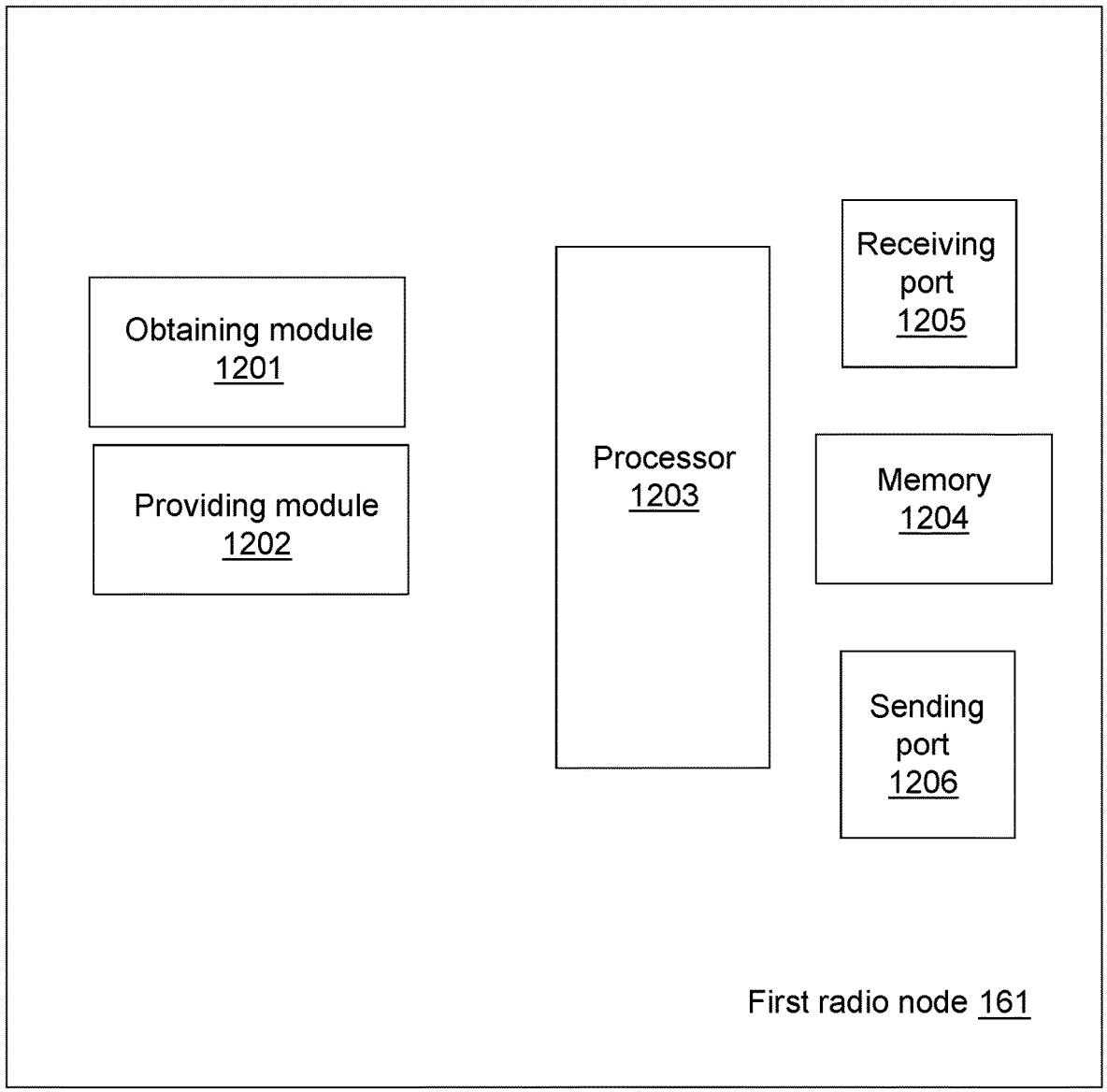
FIG. 12 is a block diagram illustrating embodiments of a first radio node, according to some embodiments.

The embodiments herein for the actions performed by the first radio node 161 may be implemented through one or more processors, such as the processor 1203 in the first radio node 161 depicted in FIG. 12, together with computer program code for performing the functions and actions of the embodiments herein. The program code mentioned above may also be provided as a computer program product, for instance in the form of a data carrier carrying computer program code for performing the embodiments herein when being loaded into the in the first radio node 161. One such carrier may be in the form of a CD ROM disc. It is however feasible with other data carriers such as a memory stick. The computer program code may furthermore be provided as pure program code on a server and downloaded to the first radio node 161. The computer program code may also be provided as a service from the cloud. As indicated above, the processor 1203 may comprise one or more circuits, which may also be referred to as one or more modules in some embodiments, each configured to perform the actions carried out by the first radio node 161, as described above in reference to FIG. 12, e.g., the obtaining module 1201 and the providing module 1202. Hence, in some embodiments, the obtaining module 1201 and the providing module 1202 described above may be implemented as one or more applications running on one or more processors such as the processor 1203. That is, the methods according to the embodiments described herein for the first radio node 161 may be respectively implemented by means of a computer program product, comprising instructions, i.e., software code portions, which, when executed on at least one processor, cause the at least one processor to carry out the actions described herein, as performed by the first radio node 161. The computer program product may be stored on a computer-readable storage medium. The computer-readable storage medium, having stored thereon the computer program, may comprise instructions which, when executed on at least one processor, cause the at least one processor to carry out the actions described herein, as performed by the first radio node 161. In some embodiments, the computer-readable storage medium may be a non-transitory computer-readable storage medium, such as a CD ROM disc, a memory stick, or stored in the cloud space. In other embodiments, the computer program product may be stored on a carrier containing the computer program, wherein the carrier is one of an electronic signal, optical signal, radio signal, or the computer-readable storage medium, as described above.

The first radio node 161 may further comprise a memory 1204 comprising one or more memory units. The memory 1204 may be arranged to be used to store obtained information, such as the information received by the processor 1203, store data configurations, schedulings, and applications etc. to perform the methods herein when being executed in the first radio node 161. Memory 1204 may be in communication with the processor 1203. Any of the other information processed by the processor 1203 may also be stored in the memory 1204.

In some embodiments, information e.g., from the communication device 150 or the second radio node 162, may be received through a receiving port 1205. The receiving port 1205 may be in communication with the processor 1203. The receiving port 1205 may also be configured to receive other information.

The processor 1203 may be further configured to send messages, e.g., to the communication device 150 or the second radio node 162, through a sending port 1206, which may be in communication with the processor 1203, and the memory 1204.

Those skilled in the art will also appreciate that the any module within the first radio node 161, e.g., the obtaining module 1201 and the providing module 1202 described above, may refer to a combination of analog and digital circuits, and/or one or more processors configured with software and/or firmware, e.g. stored in the memory, that when executed by the one or more processors such as the processor 1203, perform actions as described above, in relation to FIGS. 4-9. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

The invention claimed is:

1. A method performed by a communication device to determine whether to allow a first vehicle to overtake a vehicle platoon comprising two or more second vehicles, wherein the communication device is external to the first vehicle and the vehicle platoon, the method comprising:
   obtaining information about the first vehicle, when the first vehicle is within a first distance behind the vehicle platoon;
   determining whether to allow the first vehicle to overtake the vehicle platoon based on the obtained information;
   providing, based on a result of the determining, a first indication to at least one of: a) a first radio node in the first vehicle, and b) a second radio node in one of the second vehicles in the vehicle platoon, wherein the first indication is a request for at least one of the second vehicles in the vehicle platoon to create a space for overtaking in the vehicle platoon for the first vehicle, the space being based on the obtained information;
   obtaining a second indication that the space has been created, from at least one of: a) the second radio node and b) a third radio node in one of the second vehicles in the vehicle platoon; and
   providing, as a fifth indication, an instruction for the at least the one of the second vehicles in the vehicle platoon to close the created space, the fifth indication provided to at least one of: i) the second radio node and ii) the third radio node in one of the second vehicles in the vehicle platoon.

2. The method according to claim 1, wherein the method further comprises:

determining that the space should be created, based on at least one of: the obtained information, and one or more current conditions in an environment of the vehicle platoon; and determining between which second vehicles in the vehicle platoon the space should be created, based on at least one of: the obtained information, and the one or more current conditions in the environment of the vehicle platoon.

3. The method according to claim 1, wherein the method further comprises:

providing a third indication based on the obtained second indication, wherein the third indication is one of: a) an authorization to the first radio node in the first vehicle for the first vehicle to take the created space; and b) a request for one of the vehicles in the vehicle platoon to signal an authorization to take the created space to the first vehicle, said request provided to at least one of: i) the second radio node and ii) a fourth radio node in one of the second vehicles in the vehicle platoon.

4. The method according to claim 2, further comprising:
obtaining a request, from the first radio node, for the first vehicle to overtake the vehicle platoon, wherein obtaining the information about the first vehicle is responsive to the obtained request.

5. The method according to claim 3, further comprising:
obtaining a fourth indication that taking of the created space by the first vehicle is complete, the fourth indication obtained from one of: a) the first radio node, b) the second radio node, and c) another radio node in one of the second vehicles in the vehicle platoon.

6. The method according to claim 1, further comprising:
obtaining a sixth indication that an overtaking of the vehicle platoon by the first vehicle is complete, the sixth indication obtained from one of: a) the first radio node, b) the second radio node, and c) one other radio node in one of the second vehicles in the vehicle platoon.

7. The method according to claim 3, further comprising:
scheduling a time to allow the first vehicle to overtake the vehicle platoon when one or more first vehicles are within a second distance behind the vehicle platoon, wherein at least one of the first indication and the third indication is based on the scheduled time.

8. A communication device configured to determine whether to allow a first vehicle to overtake a vehicle platoon comprising two or more second vehicles, wherein the communication device is external to the first vehicle and the vehicle platoon, the communication device comprising:

at least one processor; and at least one memory storing computer-executable instructions that, when executed by the at least one processor, configure the communication device to:

obtain information about the first vehicle, when the first vehicle is within a first distance behind the vehicle platoon, determine whether to allow the first vehicle to overtake the vehicle platoon based on the obtained information, provide, based on a result of the determining, a first indication to at least one of:

a) a first radio node in the first vehicle, and b) a second radio node in one of the second vehicles in the vehicle platoon, wherein the first indication is a request for at least one of the second vehicles in the vehicle platoon to create a space for overtaking in the vehicle platoon for the first vehicle, the space being based on the obtained information;

obtain a second indication that the space has been created, from at least one of: a) the second radio node and b) a third radio node in one of the second vehicles in the vehicle platoon; and provide, as a fifth indication, an instruction for the at least the one of the second vehicles in the vehicle platoon to close the created space, the fifth indication provided to at least one of: i) the second radio node and ii) the third radio node in one of the second vehicles in the vehicle platoon.

9. The communication device according to claim 8, wherein execution of the instructions further configures the communication device to:

determine that the space should be created, based on at least one of: the obtained information, and one or more current conditions in an environment of the vehicle platoon; and determine between which second vehicles in the vehicle platoon the space should be created, based on at least one of: the obtained information, and the one or more current conditions in the environment of the vehicle platoon.

10. The communication device according to claim 8, wherein execution of the instructions further configures the communication device to:

provide a third indication based on the obtained second indication, wherein the third indication is one of: a) an authorization to the first radio node in the first vehicle for the first vehicle to take the created space; and b) a request for one of the vehicles in the vehicle platoon to signal an authorization to take the created space to the first vehicle, said request provided to at least one of: i) the second radio node and ii) a fourth radio node in one of the second vehicles in the vehicle platoon.

11. The communication device according to claim 8, wherein execution of the instructions further configures the communication device to:

obtain a request, from the first radio node, for the first vehicle to overtake the vehicle platoon, wherein obtaining the information about the first vehicle is responsive to the obtained request.

12. The communication device according to claim 10, wherein execution of the instructions further configures the communication device to:

obtain a fourth indication that taking of the created space by the first vehicle is complete, the fourth indication obtained from one of: a) the first radio node, b) the second radio node, and c) another radio node in one of the second vehicles in the vehicle platoon.

13. The communication device according to claim 8, wherein execution of the instructions further configures the communication device to:

obtain a sixth indication that an overtaking of the vehicle platoon by the first vehicle is complete, the sixth indication obtained from one of: a) the first radio node, b) the second radio node, and c) one other radio node in one of the second vehicles in the vehicle platoon.

14. The communication device according to claim 10, wherein execution of the instructions further configures the communication device to:

schedule a time to allow the first vehicle to overtake the vehicle platoon when one or more first vehicles are within a second distance behind the vehicle platoon, wherein at least one of the first indication and the third indication is based on the scheduled time.

15. A method performed by a second radio node in a second vehicle operating in a vehicle platoon comprising two or more second vehicles, the method comprising:
- obtaining a first indication from a communication device, wherein the first indication is a request for at least one of the second vehicles in the vehicle platoon to create a space for overtaking in the vehicle platoon for a first vehicle, wherein the communication device is external to the first vehicle and the vehicle platoon; and
- providing the obtained first indication to a third radio node in one of the second vehicles in the vehicle platoon;
- obtaining a second indication that the space has been created, wherein the second indication is obtained from at least one of the following: the third radio node, and a fourth radio node in a further one of the second vehicles;
- providing the second indication to the communication device; and
- obtaining, from the communication device as a fifth indication, an instruction for the at least the one of the second vehicles in the vehicle platoon to close the created space.

16. A second radio node configured to be located in a second vehicle operating in a vehicle platoon comprising two or more second vehicles, the second radio node comprising:
- at least one processor; and
- at least one memory storing computer-executable instructions that, when executed by the at least one processor, configure the second radio node to:
  - obtain a first indication from a communication device, wherein the first indication is a request for at least one of the second vehicles in the vehicle platoon to create a space for overtaking in the vehicle platoon for a first vehicle,
    wherein the communication device is external to the first vehicle and the vehicle platoon; and
  - provide the obtained first indication to a third radio node in one of the second vehicles in the vehicle platoon;
  - obtain a second indication that the space has been created, wherein the second indication is obtained from at least one of the following: the third radio node, and a fourth radio node in a further one of the second vehicles;
  - provide the second indication to the communication device; and
  - obtain, from the communication device as a fifth indication, an instruction for the at least the one of the second vehicles in the vehicle platoon to close the created space.

* * * * *